(12) United States Patent
Simoudis

(10) Patent No.: US 12,450,959 B2
(45) Date of Patent: Oct. 21, 2025

(54) SYSTEMS AND METHODS FOR MANAGING VEHICLE DATA

(71) Applicant: Synapse Partners, LLC, Menlo Park, CA (US)

(72) Inventor: Evangelos Simoudis, Menlo Park, CA (US)

(73) Assignee: Synapse Partners, LLC, Menlo Park, CA (US)

( * ) Notice: Subject to any disclaimer, the term of this patent is extended or adjusted under 35 U.S.C. 154(b) by 0 days.

(21) Appl. No.: 18/646,539

(22) Filed: Apr. 25, 2024

(65) Prior Publication Data

US 2024/0290148 A1 Aug. 29, 2024

Related U.S. Application Data

(63) Continuation of application No. 16/983,478, filed on Aug. 3, 2020, now Pat. No. 12,002,309, which is a
(Continued)

(51) Int. Cl.
*G07C 5/08* (2006.01)
*B60K 35/00* (2006.01)
(Continued)

(52) U.S. Cl.
CPC .............. *G07C 5/085* (2013.01); *B60K 35/00* (2013.01); *B60W 60/001* (2020.02);
(Continued)

(58) Field of Classification Search
CPC ........ G07C 5/085; G07C 5/008; B60K 35/00; B60K 35/10; B60K 35/22; B60K 35/85;
(Continued)

(56) References Cited

U.S. PATENT DOCUMENTS

| 7,636,626 B2 | 12/2009 | Oesterling et al. |
| 7,668,691 B2 | 2/2010 | Counts et al. |

(Continued)

FOREIGN PATENT DOCUMENTS

| CN | 107918753 A | 4/2018 |
| CN | 110647929 A | 1/2020 |

(Continued)

OTHER PUBLICATIONS

Tanaka, K., et al., "A Destination Prediction Method Using Driving Contexts and Trajectory for Car Navigation Systems", Proceedings of the 2009 ACM Symposium on Applied Computing, SAC '09 (Association for Computing Machinery, New York, NY), pp. 190-195 (2009) [https://doi.org/10.1145/1529282.1529323].

(Continued)

*Primary Examiner* — Ryan W Sherwin
(74) *Attorney, Agent, or Firm* — Haynes and Boone, LLP

(57) ABSTRACT

The present disclosure provides methods and systems for managing autonomous vehicle data. The method may comprise: (a) collecting said autonomous vehicle data from the autonomous vehicle, wherein the autonomous vehicle data has a size of at least 1 terabyte; (b) processing the autonomous vehicle data to generate metadata corresponding to the autonomous vehicle data, wherein the autonomous vehicle data is stored in a database; (c) using at least a portion of the metadata to retrieve a subset of the autonomous vehicle data from the database, which subset of the autonomous vehicle data has a size less than the autonomous vehicle data; and (d) storing or transmitting the subset of the autonomous vehicle data.

17 Claims, 20 Drawing Sheets

Related U.S. Application Data continuation of application No. PCT/US2019/060094, filed on Nov. 6, 2019.

(60) Provisional application No. 62/875,919, filed on Jul. 18, 2019, provisional application No. 62/852,769, filed on May 24, 2019, provisional application No. 62/799,697, filed on Jan. 31, 2019, provisional application No. 62/757,517, filed on Nov. 8, 2018.

(51) Int. Cl.
| | |
|---|---|
| *B60W 60/00* | (2020.01) |
| *G06F 16/2457* | (2019.01) |
| *G06N 5/02* | (2023.01) |
| *G06N 5/04* | (2023.01) |
| *G06N 20/00* | (2019.01) |
| *G07C 5/00* | (2006.01) |

(52) U.S. Cl.
CPC ........ *G06F 16/24573* (2019.01); *G06N 5/02* (2013.01); *G06N 5/04* (2013.01); *G06N 20/00* (2019.01); *G07C 5/008* (2013.01)

(58) Field of Classification Search
CPC ............ B60W 60/001; G06F 16/24573; G06F 16/2219; G06F 16/21; G06F 16/2291; G06N 5/02; G06N 5/04; G06N 20/00; G06N 5/022; H04W 4/40
See application file for complete search history.

(56) References Cited

U.S. PATENT DOCUMENTS

| | | | |
|---|---|---|---|
| 7,848,765 | B2 | 12/2010 | Phillips et al. |
| 8,881,057 | B2 | 11/2014 | Mori et al. |
| 8,990,235 | B2 | 3/2015 | King et al. |
| 8,996,304 | B2 | 3/2015 | Needham et al. |
| 9,124,998 | B2 | 9/2015 | Sasaki et al. |
| 9,140,570 | B1 | 9/2015 | Baird |
| 9,377,319 | B2 | 6/2016 | San Filippo et al. |
| 9,536,197 | B1 | 1/2017 | Penilla et al. |
| 9,740,205 | B2 | 8/2017 | Ross et al. |
| 9,751,532 | B2 | 9/2017 | Gordon et al. |
| 9,846,049 | B2 | 12/2017 | Krumm |
| 9,900,747 | B1 | 2/2018 | Park |
| 9,928,524 | B2 | 3/2018 | Grimm et al. |
| 10,104,494 | B2 | 10/2018 | Bellens et al. |
| 10,175,054 | B2 | 1/2019 | Woodard et al. |
| 10,198,399 | B1 | 2/2019 | Fritchman et al. |
| 10,343,685 | B2 | 7/2019 | Zhu et al. |
| 10,371,526 | B2 | 8/2019 | McGavran et al. |
| 10,449,958 | B2 | 10/2019 | Jiang et al. |
| 10,458,806 | B2 | 10/2019 | Chen et al. |
| 10,469,619 | B2 | 11/2019 | Shimizu et al. |
| 10,489,222 | B2 | 11/2019 | Sathyanarayana et al. |
| 10,553,112 | B2 | 2/2020 | Gogic et al. |
| 10,616,369 | B1* | 4/2020 | d'Andrea ............. G06Q 10/109 |
| 10,671,069 | B2 | 6/2020 | Son et al. |
| 10,816,351 | B1 | 10/2020 | Yao et al. |
| 10,906,552 | B2 | 2/2021 | Hecht |
| 10,928,209 | B2 | 2/2021 | Scofield et al. |
| 10,949,886 | B2 | 3/2021 | Tong |
| 11,054,270 | B1 | 7/2021 | Singh et al. |
| 11,120,349 | B1 | 9/2021 | Wu et al. |
| 11,526,811 | B1 | 12/2022 | Wu et al. |
| 11,587,368 | B2 | 2/2023 | Cordova et al. |
| 11,704,572 | B1 | 7/2023 | Pronovost et al. |
| 11,768,488 | B2 | 9/2023 | Cella |
| 12,002,309 | B2* | 6/2024 | Simoudis .............. G07C 5/008 |
| 2008/0248815 | A1 | 10/2008 | Busch |
| 2009/0192851 | A1 | 7/2009 | Bishop |
| 2009/0326791 | A1 | 12/2009 | Horvitz et al. |
| 2010/0017427 | A1 | 1/2010 | Johnson et al. |
| 2011/0184974 | A1 | 7/2011 | Rawal et al. |
| 2011/0238289 | A1 | 9/2011 | Lehmann et al. |
| 2013/0066548 | A1 | 3/2013 | Gruen et al. |
| 2013/0151291 | A1 | 6/2013 | Salway |
| 2013/0158866 | A1 | 6/2013 | Weir et al. |
| 2014/0009275 | A1 | 1/2014 | Bowers et al. |
| 2014/0114705 | A1 | 4/2014 | Bashvitz et al. |
| 2014/0156806 | A1 | 6/2014 | Karpistsenko et al. |
| 2014/0279012 | A1 | 9/2014 | Scofield et al. |
| 2015/0154638 | A1 | 6/2015 | Burlingham et al. |
| 2015/0161697 | A1 | 6/2015 | Jones et al. |
| 2015/0345980 | A1 | 12/2015 | Subramanian et al. |
| 2016/0003637 | A1 | 1/2016 | Andersen |
| 2016/0035150 | A1* | 2/2016 | Barfield, Jr. ........ G05B 23/0254 701/29.3 |
| 2016/0142492 | A1 | 5/2016 | Fang et al. |
| 2016/0179936 | A1 | 6/2016 | Mathur et al. |
| 2016/0195404 | A1 | 7/2016 | Prasad et al. |
| 2017/0006135 | A1 | 1/2017 | Siebel et al. |
| 2017/0046135 | A1 | 2/2017 | Hazarika |
| 2017/0059331 | A1 | 3/2017 | Ni et al. |
| 2017/0059337 | A1 | 3/2017 | Barker et al. |
| 2017/0178044 | A1 | 6/2017 | Wang et al. |
| 2017/0193627 | A1 | 7/2017 | Urmson et al. |
| 2017/0195325 | A1 | 7/2017 | Yamamoto |
| 2017/0229018 | A1 | 8/2017 | Levy et al. |
| 2017/0240048 | A1 | 8/2017 | Snyder |
| 2017/0241788 | A1 | 8/2017 | Chin et al. |
| 2017/0248963 | A1 | 8/2017 | Levinson et al. |
| 2017/0255868 | A1 | 9/2017 | Gelinas et al. |
| 2017/0337261 | A1 | 11/2017 | Wang |
| 2018/0038704 | A1 | 2/2018 | Nilsson et al. |
| 2018/0113914 | A1 | 4/2018 | Mehedy et al. |
| 2018/0114192 | A1 | 4/2018 | Bryant |
| 2018/0137593 | A1 | 5/2018 | Djuric et al. |
| 2018/0141562 | A1 | 5/2018 | Singhal |
| 2018/0150697 | A1 | 5/2018 | Guttmann et al. |
| 2018/0150893 | A1 | 5/2018 | Nallu et al. |
| 2018/0157984 | A1 | 6/2018 | O'Herlihy et al. |
| 2018/0181860 | A1 | 6/2018 | Verbist et al. |
| 2018/0268431 | A1 | 9/2018 | Harris |
| 2018/0292824 | A1 | 10/2018 | Kazemi et al. |
| 2019/0020973 | A1 | 1/2019 | Harish et al. |
| 2019/0056233 | A1 | 2/2019 | Liu et al. |
| 2019/0066250 | A1 | 2/2019 | Levy et al. |
| 2019/0094034 | A1 | 3/2019 | Aist et al. |
| 2019/0145779 | A1 | 5/2019 | Li et al. |
| 2019/0186939 | A1 | 6/2019 | Cox et al. |
| 2019/0213272 | A1 | 7/2019 | Wong et al. |
| 2019/0228596 | A1 | 7/2019 | Mondello et al. |
| 2019/0259223 | A1 | 8/2019 | Sangameswaran et al. |
| 2019/0266346 | A1 | 8/2019 | O'Brien et al. |
| 2019/0287032 | A1* | 9/2019 | Seabolt ................ G06Q 50/265 |
| 2019/0288852 | A1 | 9/2019 | Shetye et al. |
| 2019/0296926 | A1 | 9/2019 | Palan et al. |
| 2019/0311241 | A1 | 10/2019 | Friedman et al. |
| 2019/0376798 | A1 | 12/2019 | Abramson |
| 2019/0377359 | A1 | 12/2019 | Lanke et al. |
| 2019/0387365 | A1 | 12/2019 | Spruyt et al. |
| 2019/0394513 | A1 | 12/2019 | Shin et al. |
| 2020/0001774 | A1 | 1/2020 | Kim |
| 2020/0057601 | A1 | 2/2020 | Lenke et al. |
| 2020/0110951 | A1 | 4/2020 | Cordell et al. |
| 2020/0111268 | A1 | 4/2020 | Montague et al. |
| 2020/0182637 | A1 | 6/2020 | Kumar et al. |
| 2020/0182643 | A1 | 6/2020 | Ludwig |
| 2020/0226902 | A1 | 7/2020 | Mandaric et al. |
| 2020/0234048 | A1 | 7/2020 | Rogan |
| 2020/0250696 | A1 | 8/2020 | Cordell |
| 2020/0278693 | A1 | 9/2020 | Vijaya Kumar et al. |
| 2020/0363220 | A1 | 11/2020 | Simoudis |
| 2020/0372590 | A1 | 11/2020 | Chowdhary et al. |
| 2021/0009136 | A1 | 1/2021 | DiMeo et al. |
| 2021/0056778 | A1* | 2/2021 | Wylie ................. G07C 5/0816 |
| 2021/0101592 | A1 | 4/2021 | Kokes et al. |

(56) References Cited

U.S. PATENT DOCUMENTS

| | | | |
|---|---|---|---|
| 2021/0133810 A1 | 5/2021 | MacNeille et al. | |
| 2021/0325199 A1 | 10/2021 | Yano et al. | |

FOREIGN PATENT DOCUMENTS

| | | | |
|---|---|---|---|
| EP | 2369299 | B1 | 8/2013 |
| EP | 2677484 | B1 | 7/2017 |
| EP | 3567475 | A1 | 11/2019 |
| JP | 2003207342 | A | 7/2003 |
| JP | 2005537687 | A | 12/2005 |
| JP | 2008152655 | A | 7/2008 |
| JP | 2013101051 | A | 5/2013 |
| JP | 2018025865 | A | 2/2018 |
| JP | 2020004210 | A | 1/2020 |
| KR | 20100701149 | B1 | 3/2007 |
| KR | 1020140134430 | | 6/2015 |
| KR | 20180009882 | A | 1/2018 |
| KR | 1020180047049 | | 5/2018 |
| KR | 20190100895 | A | 8/2019 |
| WO | 2017210222 | A1 | 12/2017 |
| WO | 2018181974 | A1 | 10/2018 |
| WO | 2019032519 | A1 | 2/2019 |
| WO | 2019084012 | A1 | 5/2019 |
| WO | 2019125446 | A1 | 6/2019 |
| WO | 2020081576 | A1 | 4/2020 |
| WO | 2020097221 | A1 | 5/2020 |
| WO | 2021158390 | A1 | 8/2021 |

OTHER PUBLICATIONS

Allegro, "The case for a deep learning computer vision platform", Product Whitepaper, 2018, 26 pages.

Boland, M., "Is Uber Local Advertising's Duopoly Killer?", Street Fight, Nov. 13, 2019, 3 pages. Accessed from: https://streetfightmag.com/2019/11/13/is-uber-local-advertisings-duopolykiller/?mc_cid=51 ddd8a246& mc_eid=d23fad2941 &doing_wp_cron=1576546497.131 0091018676757812500#.XfgwwmRKiUm. Accessed on: Dec. 16, 2019.

Dilworth, J., "Kinetica and NVIDIA Open Door for Fast Analysis of Large Geospatial Datasets", K: NVIDIA Blog, Sep. 19, 2017, 13 pages. Retrieved Jan. 29, 2020, from https://blogs.nvidia.com/blog/2017/09/19/large-geospatial-datasets/.

EP19873309.9 European Supplementary Search Report dated May 31, 2022.

EP19881207.5 European Supplementary Search Report dated Jun. 17, 2022.

EP21751366.2 European Supplementary Search Report dated Jan. 15, 2024.

Hawkins, A., "GM's data mining is just the beginning of the in-car advertising blitz", The Verge, Oct. 17, 2018, 9 pages. Available at https://www.theverge.com/2018/10/17/17990052/gm-radio-listen-tracking-habits-advertising-future.

Hu, C., "What Does Music Have To Gain From The Future Of Transportation? More Than You Might Think", Forbes, Nov. 6, 2018, 10 Pages. Available at https://www.forbes.com/sites/cheriehu/2018/11/06/music-future-transportation-ridesharing-5g-startups/?sh=4fb3be6f7169.

Hu, M., et al., "Decision Tree-Based Maneuver Prediction for Driver Rear-End Risk-Avoidance Behaviors in Cut-In Scenarios", Hindawi, Journal of Advanced Transportation, vol. 2017, Article ID 7170358, Feb. 15, 2017, 13 pages. Available at https://doi.org/10.1155/2017/7170358.

Lee, S., et al., "Next Place Prediction Based on Spatiotemporal Pattern Mining of Mobile Device Logs", Sensors, Jan. 23, 2016, 2016; 16(145), pp. 1-19.

Lipinsky, M., "On the Way to One Volkswagen Automotive Platform", Volkswagen Aktiengesellschaft, Nov. 13, 2019, 15 pages.

Muller, J., "What's next: a digital butler for your car", AXIOS, Dec. 21, 2021, 3 pages. Available at https://www.axios.com/2021/12/21/cerence-copilot-artificial-intelligence-anticipates-drivers-needs.

O'Kane, S., "The head of Android auto on how google will power the car of the near future", The Verge, Jan. 25, 2019, 17 Pages.

PCT/US2019/056352 Search Report & Written Opinion dated Apr. 6, 2020.

PCT/US2019/060094 Search Report & Written Opinion dated Apr. 9, 2020.

PCT/US2021/015020 Search Report & Written Opinion dated May 21, 2021.

PCT/US2021/046303 Search Report & Written Opinion dated Nov. 25, 2021.

PCT/US2021/052310 Search Report & Written Opinion dated Jan. 20, 2022.

Reddy, M., "Euclid: Blueprint to Create End-to-End AI Application Pipelines", The Hive, Apr. 10, 2019, 6 pages. Retrieved from: https://medium.com/hivedata/euclid-blueprint-to-create-end-to-end-ai-application-pipelines-3a8513d709ec.

Thompson, S., et al., "Twelve Million Phones, One Dataset, Zero Privacy", New York Times, Dec. 19, 2019, 32 pages. Retrieved from: https://www.nytimes.com/interactive/2019/12/19/opinion/location-tracking-cell-phone.html.

Unknown Author, "Uber Privacy Notice", Nov. 12, 2019, 19 pages. Retrieved from https://www.uber.com/global/en/privacy/notice/. Retrieved on Dec. 10, 2019.

Wiggers, K., "Buick and Yelp partner to offer restaurant reservations in cars, trucks, and crossovers", Venture Beat, Nov. 2, 2018, 5 pages. Retrieved from: https://venturebeat.com/business/buick-and-yelp-partner-to-offer-restaurant-reservations-in-cars-trucks-and-crossovers/.

Xevo, "Personalization on the Edge", 8 pages. Retrieved from: https://www.xevo.com/carware/.

Xia, L., et al., "Decision Tree-Based Contextual Location Prediction from Mobile Device Logs", Hindawi, Mobile Information Systems, vol. 2018, Article ID 1852861, Apr. 1, 2018, 11 pages. Available at https://doi.org/10.1155/2018/1852861.

Yin, L., et al., "When to use what data set for your self-driving car algorithm: An overview of publicly available driving datasets", 2017 IEEE 20th International Conference on Intelligent Transportation Systems (ITSC), Yokohama, Japan, 2017, pp. 1-8, doi: 10.1109/ITSC.2017.8317828.

\* cited by examiner

| App Name | Transmission Flag | Vehicle ID | Requesting Data Center Apps | Data Type | Required Data | Transmission Timing Delay | Compression Type | Encryption Type | Regulation Rules |
|---|---|---|---|---|---|---|---|---|---|
| Pothole detector | Set | string | (app_name, loc) | Video stream | Stream1 | 0 | Lossless | RSA | Empty |
| ⋮ | ⋮ | ⋮ | ⋮ | ⋮ | ⋮ | ⋮ | ⋮ | ⋮ | ⋮ |

*FIG. 3*

SYSTEMS AND METHODS FOR MANAGING VEHICLE DATA

CROSS-REFERENCE

This application is a continuation application of U.S. Non-Provisional patent application Ser. No. 16/983,478, filed Aug. 3, 2020, which is a continuation application of International Patent Application PCT/US2019/060094, filed Nov. 6, 2019, which claims priority to U.S. Provisional Patent Application No. 62/757,517, filed Nov. 8, 2018, U.S. Provisional Patent Application No. 62/799,697, filed on Jan. 31, 2019, U.S. Provisional Patent Application No. 62/852,769, filed on May 24, 2019, and U.S. Provisional Application No. 62/875,919, filed Jul. 18, 2019, each of which is entirely incorporated herein by reference.

BACKGROUND

An autonomous vehicle is a vehicle that may be capable of sensing its environment and navigating with little or no user input. An autonomous vehicle system can sense its environment using sensing devices such as Radar, laser imaging detection and ranging (Lidar), image sensors, and the like. The autonomous vehicle system can further use information from global positioning systems (GPS) technology, navigation systems, vehicle-to-vehicle communication, vehicle-to-infrastructure technology, and/or drive-by-wire systems to navigate the vehicle.

A single highly automated vehicle or autonomous vehicle can generate one to five terabytes (1-5 TB) of raw data per hour. Operating at 14 to 16 hours per day may mean generating as much as 50 terabytes per vehicle per day or 20 petabytes per vehicle per year. A modest fleet of 5,000 highly automated vehicles (there are 14,000 taxis in New York City alone) may generate over 100 exabytes of raw data annually. Such data may be generated by, for example, an autonomous vehicle stack or automated vehicle stack which may include all supporting tasks such as communications, data management, fail safe, as well as the middleware and software applications. Such data may also include data generated from communications among vehicles or from the transportation infrastructure. An autonomous vehicle stack or automated vehicle stack may consolidate multiple domains, such as perception, data fusion, cloud/over the air (OTA), localization, behavior (a.k.a. driving policy), control, and safety, into a platform that can handle end-to-end automation. For example, an autonomous vehicle stack or automated vehicle stack may include various runtime software components or basic software services such as perception (e.g., application-specific integrated circuit (ASIC), field-programmable gate array (FPGA), graphics processing unit (GPU) accelerators, single instruction multiple data (SIMD) memory, sensors/detectors, such as cameras, Lidar, radar, GPS, etc.), localization and planning (e.g., data path processing, double data rate (DDR) memory, localization datasets, inertia measurement, global navigation satellite system (GNSS)), decision or behavior (e.g., motion engine, error-correcting code (ECC) memory, behavior modules, arbitration, predictors), control (e.g., lockstep processor, DDR memory, safety monitors, fail safe fallback, by-wire controllers), connectivity, and input/output (I/O) (e.g., radio frequency (RF) processors, network switches, deterministic bus, data recording) and various others. Such data may be generated by one or more sensors and/or various other modules as part of the autonomous vehicle stack or automated vehicle stack.

SUMMARY

A significant amount of autonomous or automated vehicle data can be valuable and may be needed to be identified, selected, processed, transmitted and stored at the vehicle, edge infrastructure, and cloud contexts against different priorities of cost, timing, and privacy.

Recognized herein is a need for methods and systems for managing autonomous or automated vehicle data in a manner that is safe, secure, cost-effective, scalable, and fosters open applications.

The present disclosure provides systems and methods for managing vehicle data. In particular, the provided data management systems and methods can be applied to data related to various aspects of the automotive value chain including, for example, vehicle design, test, and manufacturing (e.g., small batch manufacturing and the productization of autonomous vehicles), creation of vehicle fleets that involves configuring, ordering services, financing, insuring, and leasing a fleet of vehicles, operating a fleet that may involve service, personalization, ride management and vehicle management, maintaining, repairing, refueling and servicing vehicles, and dealing with accidents and other events happening to these vehicles or by a fleet. As used herein, the term "vehicle data," generally refers to data generated by any types of vehicle, such as a connected vehicle, a connected and automated vehicle, or a connected and autonomous vehicle, unless context suggests otherwise. The term "autonomous vehicle data" as utilized herein, generally refers to data generated by an autonomous vehicle. Although embodiments of the present disclosure have been described with respect to autonomous vehicles, it should be appreciated that the embodiments can be applicable or adapted for automated vehicles.

In some embodiments, the provided data management system may comprise a data orchestrator onboard an autonomous or an automated vehicle. The data orchestrator may be capable of orchestrating and managing vehicle data. In some cases, autonomous vehicle data may comprise data generated by the autonomous vehicle stack (e.g., data captured by the autonomous vehicle's sensors), as well as driver and passenger data. The data orchestrator may be configured to determine which of (which portion of) the vehicle data is to be communicated to which data center or third-party entity, and when such data is transmitted. For example, some of the autonomous vehicle data may need to be communicated immediately or when the autonomous vehicle is in motion, whereas other data may be communicated when the autonomous vehicle is stationary (while waiting for the next assignment/task or being maintained).

In an aspect, a method for managing vehicle data of a vehicle is provided. The method may comprise: (a) collecting the vehicle data from the vehicle, wherein the vehicle data has a size of at least 1 terabyte; (b) processing the vehicle data to generate metadata corresponding to the vehicle data, wherein the vehicle data is stored in a database; (c) using at least a portion of the metadata to retrieve a subset of the vehicle data from the database, which subset of the vehicle data has a size less than the vehicle data; and (d) storing or transmitting the subset of the vehicle data.

In some embodiments, the method further comprises storing the vehicle data processed in (b) in the database. In some embodiments, the step of (c) comprises using the metadata to retrieve the subset of the vehicle data from the database for training a predictive model, and wherein the predictive model is used for managing the vehicle data. In some cases, the predictive model is usable for transmitting the vehicle data from the vehicle to a remote entity. For example, the method further comprises using the predictive model to transmit the vehicle data from the vehicle to a database managed by the data orchestrator.

In some embodiments, the method further comprises receiving a request from a user to access the vehicle data, and selecting the at least a portion of the metadata based at least in part on the request. In some embodiments, the vehicle is a connected vehicle, a connected and automated vehicle, or a connected and autonomous vehicle.

In another aspect, a system is provided for managing vehicle data of a vehicle. The system comprises: a database; and one or more computer processors operatively coupled to the database, wherein the one or more computer processors are individually or collectively programmed to (i) collect the vehicle data from the vehicle, wherein the vehicle data has a size of at least 1 terabyte; (ii) process the vehicle data to generate metadata corresponding to the vehicle data, wherein the vehicle data is stored in the database; (iii) use at least a portion of the metadata to retrieve a subset of the vehicle data from the database, which subset of the vehicle data has a size less than the vehicle data; and (iv) store or transmit the subset of the vehicle data.

In some embodiments, the vehicle data comprises at least sensor data captured by one or more sensors and application data produced by one or more applications onboard the vehicle. In some cases, the metadata further comprises a first metadata generated by a sensor of the one or more sensors or a second metadata generated by an application of the one or more applications. In some embodiments, the metadata is generated by aligning sensor data collected by one or more sensors of the vehicle. In some embodiments, the metadata is used to retrieve the subset of the vehicle data from the database for training a predictive model, and wherein the predictive model is used for managing the vehicle data. In some cases, the predictive model is usable for transmitting the vehicle data from the vehicle to a remote entity. In some instances, the predictive model is usable for transmitting the vehicle data from the vehicle to the database managed by the system. In some embodiments, the vehicle is a connected vehicle, connected and automated vehicle or an autonomous vehicle.

Another related yet separate aspect of the present disclosure provides a data orchestrator for managing vehicle data. The data orchestrator may be onboard an autonomous vehicle. The data orchestrator may comprise: a data repository configured to store (i) data related to one or more remote entities that request one or more subsets of the vehicle data, and (ii) data related to one or more applications that generate the one or more subsets of the vehicle data, wherein the data repository is local to the vehicle where the vehicle data is collected or generated; a knowledge base configured to store a machine learning-based predictive model and user-defined rules for determining a data transmission rule comprising: (i) a selected portion of the vehicle data to be transmitted; (ii) when to transmit the selected portion of the vehicle data; and (iii) a remote entity of the one or more remote entities for receiving the selected portion of the vehicle data; and a transmission module configured to transmit a portion of the vehicle data based on the data stored in the repository and the transmission rule.

In some embodiments, the repository, knowledge base and the transmission module are onboard the vehicle. In some embodiments, the one or more remote entities comprise a cloud application, a data center, a third-party server, or another vehicle. In some embodiments, the data repository stores data indicating availability of the one or more subsets of the vehicle data, transmission timing delay, data type of the associated subset of data, or a transmission protocol.

In some embodiments, the machine learning-based predictive model is stored in a model tree structure. In some cases, the model tree structure represents relationships between machine learning-based predictive models. In some cases, a node of the model tree structure represents a machine learning-based predictive model and the node includes at least one of model architecture, model parameters, training dataset, or test dataset.

In some embodiments, the machine learning-based predictive model is generated by a model creator located in a data center. In some cases, the machine learning-based predictive model is trained and tested using metadata and the vehicle data. In some cases, the model creator is configured to generate predictive models usable for the vehicle.

In some embodiments, the knowledge base stores predictive models usable for the vehicle. In some embodiments, the selected portion of the vehicle data includes an aggregation of one or more of the subsets of vehicle data. In some embodiments, the vehicle is a connected vehicle, a connected and automated vehicle, or a connected and autonomous vehicle.

Another aspect of the present disclosure provides a method for managing vehicle data. The method comprises: (a) at a cloud, receiving vehicle data transmitted from a vehicle, wherein the vehicle data comprises at least sensor data; (b) processing the vehicle data to generate metadata corresponding to the vehicle data, wherein the metadata includes data generated by a sensor capturing the sensor data; and (d) storing the metadata in a metadata database.

In some embodiments, the vehicle data comprises stream data and batch data. In some embodiments, the vehicle data comprises application data. In some cases, the metadata further comprises metadata related to an application that produces the application data.

In some embodiments, the vehicle data is processed by a pipeline engine. In some cases, the pipeline engine comprises one or more functional components. For example, at least one of the one or more functional components is selected from a set of functions via a user interface. In some cases, at least one of the one or more functional components is configured to create a scenario data object, wherein the scenario data object is for specifying a scenario a specific metadata is used.

In some embodiments, the vehicle data processed in (b) is stored in one or more databases as part of the cloud. In some cases, the method further comprises training a predictive model using the vehicle data stored in the one or more databases. In some instances, the predictive model is used for retrieving at least a subset of the vehicle data from the vehicle. In some instances, the metadata is used to retrieve a subset of the vehicle data from the one or more database for training the predictive model. The method further comprises performing appropriateness analysis on the subset of the vehicle data according to a goal of the predictive model and correcting the subset of the vehicle data based on a result of the appropriateness analysis.

In some embodiments, the metadata further comprises metadata related to processing the vehicle data in (b). In some embodiments, the metadata is usable for retrieving one or more subsets of the vehicle data. In some embodiments, at least a portion of the vehicle data is transmitted based on a transmission scheme and wherein the transmission scheme is determined based on a request from the cloud. In some embodiments, the vehicle is a connected vehicle, connected and automated vehicle or an autonomous vehicle.

Another aspect of the present disclosure provides a system for managing vehicle data of a vehicle. The system comprises: a database; and one or more computer processors operatively coupled to the database, wherein the one or more computer processors are individually or collectively programmed to (i) receive vehicle data transmitted from a vehicle, wherein the vehicle data comprises at least sensor data; (ii) process the vehicle data to generate metadata corresponding to the vehicle data, wherein the metadata includes data generated by a sensor capturing the sensor data; (iii) store the metadata in the database.

In some embodiments, the vehicle data comprises stream data and batch data. In some embodiments, the vehicle data comprises application data. In some cases, the metadata further comprises metadata related to an application that produces the application data.

In some embodiments, the vehicle data is processed by a pipeline engine. In some cases, the pipeline engine comprises one or more functional components. In some instances, at least one of the one or more functional components is selected from a set of functions via a user interface. In some instances, at least one of the one or more functional components is configured to create a scenario data object, wherein the scenario data object is for specifying a scenario a specific metadata is used.

In some embodiments, the one or more processors are programmed to further train a predictive model using the vehicle data stored in the database. In some cases, the predictive model is used for retrieving at least a subset of the vehicle data from the vehicle. In some embodiments, the metadata further comprises metadata related to processing the vehicle data. in some embodiments, the metadata is usable for retrieving one or more subsets of the vehicle data. In some embodiments, at least a portion of the vehicle data is transmitted based on a transmission scheme and wherein the transmission scheme is determined based on a request. In some embodiments, the vehicle is a connected vehicle, a connected and automated vehicle, or a connected and autonomous vehicle.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 3 shows an example of an Application Table.

DETAILED DESCRIPTION

Figure 1:
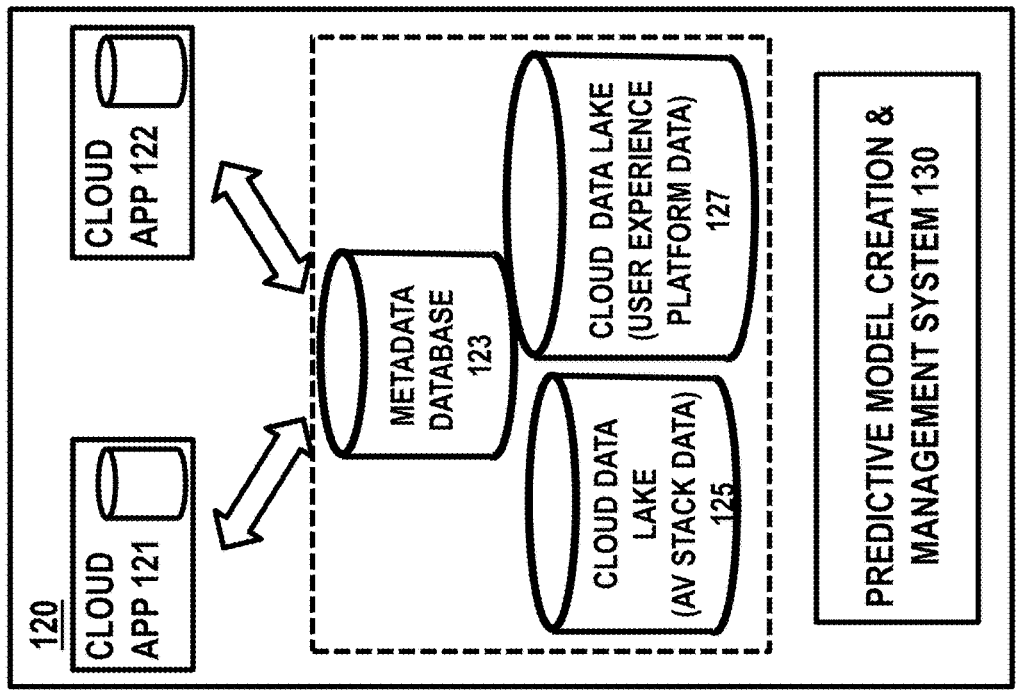
FIG. 1 schematically illustrates data flow between a data orchestrator and a data center.
Figure 1:
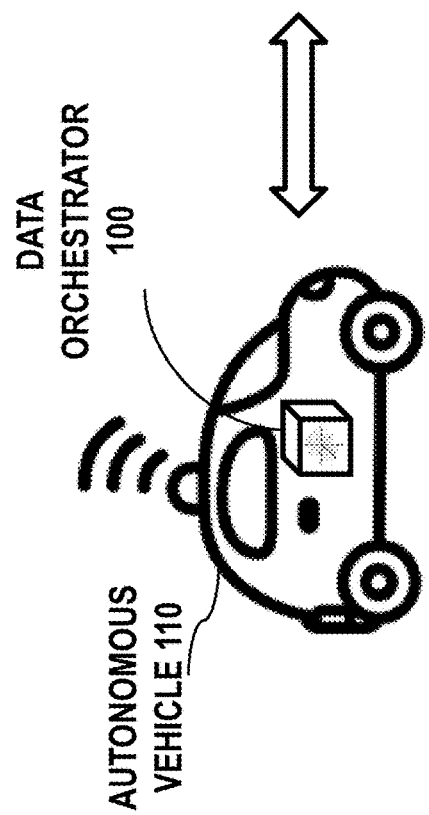

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

As used herein, the terms "autonomously controlled," "self-driving," "autonomous," and "pilotless," when used in describing a vehicle, generally refer to a vehicle that can itself perform at least some or all driving tasks and/or monitor the driving environment along at least a portion of a route. An autonomous vehicle may be an automated vehicle. Such automated vehicle may be at least partially or fully automated. An autonomous vehicle may be configured to drive with some or no intervention from a driver or passenger. An autonomous vehicle may travel from one point to another without any intervention from a human onboard the autonomous vehicle. In some cases, an autonomous vehicle may refer to a vehicle with capabilities as specified in the National Highway Traffic Safety Administration (NHTSA) definitions for vehicle automation, for example, Level 4 of the NHTSA definitions (L4), "an Automated Driving System (ADS) on the vehicle can itself perform all driving tasks and monitor the driving environment—essentially, do all the driving—in certain circumstances. The human need not pay attention in those circumstances," or Level 5 of the NHTSA definitions (L5), "an Automated Driving System (ADS) on the vehicle can do all the driving in all circumstances. The human occupants are just passengers and need never be involved in driving." It should be noted that the provided systems and methods can be applied to vehicles in other automation levels. For example, the provided systems or methods may be used for managing data generated by vehicles satisfying Level 3 of the NHTSA definitions (L3), "drivers are still necessary in level 3 cars, but are able to completely shift safety-critical functions to the vehicle, under certain traffic or environmental conditions. It means that the driver is still present and will intervene if necessary, but is not required to monitor the situation in the same way it does for the previous levels." In some cases, an automated vehicle may refer to a vehicle with capabilities specified in the Level 2 of the NHTSA definitions, "an advanced driver assistance system (ADAS) on the vehicle can itself actually control both steering and braking/accelerating simultaneously under some circumstances. The human driver has to pay full attention ("monitor the driving environment") at all times and perform the rest of the driving task," or Level 3 of the NHTSA definitions, "an Automated Driving System (ADS) on the vehicle can itself perform all aspects of the driving task under some circumstances. In those circumstances, the human driver has to be ready to regain control at any time when the ADS requests the human driver to do so. In all other circumstances, the human driver performs the driving task." The automated vehicle may also include those with Level 2+ automated driving capabilities where AI is used to improve upon Level 2 ADAS, while consistent driver control is still required. The autonomous vehicle data may also include data generated by automated vehicles.

An autonomous vehicle may be referred to as unmanned vehicle. The autonomous vehicle can be an aerial vehicle, a land vehicle, or a vehicle traversing water body. The autonomous vehicle can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle or a train), under the ground (e.g., a subway), in space (e.g., a spaceplane, a satellite, or a probe), or any combination of these environments.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real-time," as used herein, generally refers to a response time of less than 1 second, tenth of a second, hundredth of a second, a millisecond, or less, such as by a computer processor. Real-time can also refer to a simultaneous or substantially simultaneous occurrence of a first event with respect to occurrence of a second event.

The present disclosure provides methods and systems for data and knowledge management, including data processing and storage. Methods and systems of the present disclosure can be applied to various types of vehicles, such as a connected vehicle, a connected and automated vehicle, or a connected and autonomous vehicle. Connected vehicles may refer to vehicles that use any of a number of different communication technologies to communicate with the driver, other cars on the road (vehicle-to-vehicle [V2V]), roadside infrastructure (vehicle-to-infrastructure [V2I]), and the "Cloud" [V2C]. The present disclosure provides data orchestrators that may be used in various contexts, including vehicles (e.g., autonomous vehicles) and non-vehicle contexts. Data orchestrators of the present disclosure may be used for managing data from various sources or for various uses, such as Internet of Things (IoT) platforms, cyberphysical software applications and business processes, and for organizations in energy, manufacturing, aerospace, automotive, chemical, pharmaceutical, telecommunications, retail, insurance, healthcare, financial services, the public sector, and others.

Data Management System

The present disclosure provides systems and methods for managing vehicle data such as autonomous vehicle data or automated vehicle data. In particular, the provided data management systems and methods can be applied to data related to various aspects of the automotive value chain including, for example, vehicle design, test, and manufacturing (e.g., small batch manufacturing and the productization of autonomous vehicles), creation of vehicle fleets that involves configuring, ordering services, financing, insuring, and leasing a fleet of vehicles, operating a fleet that may involve service, personalization, ride management and vehicle management, maintaining, repairing, refueling and servicing vehicles, and dealing with accidents and other events happening to these vehicles or by a fleet. The data management system may be capable of managing and orchestrating data generated by a fleet at a scale of at least about 0.1 terabyte (TB), 0.5 TB, 1 TB, 2 TB, 3 TB, 4 TB, 5 TB, or more of raw data per hour. In some instances, the data management may be capable of managing and orchestrating data generated by a fleet at a scale of at least about 50 TB, 60 TB, 70 TB, 80 TB, 90 TB, 100 TB of raw data per hour. In some instances, the data management may be capable of managing and orchestrating data generated by a fleet at a scale of at least 1 gigabyte (GB), 2 GB, 3 GB, 4 GB, 5 GB or more of raw data per hour. The data management system may be capable of managing and orchestrating data of any volume up to 0.5 TB, 1 TB, 2 TB, 3 TB, 4 TB, 5 TB, 50 TB, 60 TB, 70 TB, 80 TB, 90 TB, 100 TB or more of data per hour.

In some embodiments, the data and knowledge management system may be in communication with a data orchestrator that resides onboard an autonomous or automated vehicle. The data orchestrator may be capable of managing vehicle data. The data orchestrator may be a data router. The data orchestrator may be configured to route the vehicle data in an intelligent manner to the data and knowledge management system. The data orchestrator may be configured to determine which of the autonomous vehicle data or which portion of the autonomous vehicle data is to be communicated to the data and knowledge management system of which data center or third party entity, and when this portion of autonomous vehicle data is transmitted. For example, some of the autonomous vehicle data may need to be communicated immediately or when the autonomous vehicle is in motion, whereas other data may be communicated when the autonomous vehicle is stationary (while waiting for the next assignment/task or being maintained). The provided data management system may also comprise a predictive model creation and management system that is configured to train or develop predictive models, as well as deploy models to the data orchestrator and/or the components of the autonomous vehicle stack, or the components of the automated vehicle stack. In some cases, the predictive model creation and management system may reside on a remote entity (e.g., data center). The provided data management system may further comprise a data and metadata management system that is configured to store and manage the data and associated metadata that is generated by the autonomous vehicle, and process queries and API calls issued against the data and the metadata. The data orchestrator, or the data and knowledge management system, can be implemented or provided as a standalone system.

FIG. 1 schematically illustrates the data flow between a data orchestrator 100 and a data center 120. In some, cases, the data orchestrator 100 may be configured to automate the data management process, including, for example, data creation, data cleansing, data enrichment, and delivering data across data centers, systems, and third party entities. Data collected from the autonomous vehicle 110 may comprise data captured by the autonomous vehicle's sensors. Such sensors can include, for example, the navigation system, sensors onboard the vehicle such as laser imaging detection and ranging (Lidar), radar, sonar, differential global positioning system (DGPS), inertial measurement unit (IMU), gyroscopes, magnetometers, accelerometers, ultrasonic sensors, image sensors (e.g., visible light, infrared), heat sensors, audio sensors, vibration sensors, conductivity sensors, chemical sensors, biological sensors, radiation sensors, conductivity sensors, proximity sensors, or any other type of sensors, or combination thereof. Data collected from the autonomous vehicle may also comprise fleet data (e.g., data from vehicle operating system), driver data (e.g., driver mood, driver alertness level, driving style, etc.), passenger data (e.g., data from user experience platform such as access to music, game, data from user device such as a mobile application), and various others. The data sent by the data orchestrator of a vehicle is received by the data and knowledge management system residing in a data center. The data may include data streams from one or more sensors (e.g., the output of a video camera, sensor fusion data), batch data, and/or individual records (e.g., a purchase transaction made by a passenger while being transported, individual record or series of records produced by a vehicle subsystem, e.g., a system monitoring the vehicle's engine health, or the subsystem monitoring the condition of tires, a result of a user interaction with one of the applications running on the vehicle).

In some embodiments, the data orchestrator 100 may be an edge intelligence platform. For example, the data orchestrator may be a software-based solution based on fog or edge computing concepts which extend data processing and orchestration closer to the edge (e.g., autonomous vehicle). While edge computing may refer to the location where services are instantiated, fog computing may imply distribution of the communication, computation, and storage resources and services on or in proximity to (e.g., within 5 meters or within 1 meter) devices and systems in the control of end-users or end nodes. Maintaining close proximity to the edge devices (e.g., autonomous vehicle, sensors) rather than sending all data to a distant centralized cloud, minimizes latency allowing for maximum performance, faster response times, and more effective maintenance and operational strategies. It also significantly reduces overall bandwidth requirements and the cost of managing widely distributed networks. The provided data management system may employ an edge intelligence paradigm that at least a portion of data processing can be performed at the edge. In some instances, machine learning model may be built and trained on the cloud and run on the edge device or edge system (e.g., hardware accelerator). Systems and methods of the disclosure may provide an efficient and highly scalable edge data orchestration platform that enables real-time, on-site vehicle data orchestration.

The software stack of the data management system can be a combination of services that run on the edge and cloud. Software or services that run on the edge may employ a predictive model for data orchestration. Software or services that run on the cloud may provide a predictive model creation and management system 130 for training, developing, and managing predictive models. In some cases, the data orchestrator may support ingesting of sensor data into a local storage repository (e.g., local time-series database), data cleansing, data enrichment (e.g., merging third-party data with processed data), data alignment, data annotation, data tagging, or data aggregation. Raw data may be aggregated across a time duration (e.g., about 1, 2, 3, 4, 5, 6, 7, 8, 9, 10 seconds, about 1, 2, 3, 4, 5, 6, 7, 8, 9, 10 minutes, about 1, 2, 3, 4, 5, 6, 7, 8, 9, 10 hours, etc). Alternatively or in addition, raw data may be aggregated across data types or sources and sent to a remote entity as a package.

The data orchestrator may deliver data across data centers, cloud applications, or any component that resides in the data centers (e.g., associated with third-party entities). The data orchestrator may determine which of the data or which portion of the data is to be transmitted to which data centers and/or entities and when to transmit this portion of data. For example, some of the autonomous vehicle data (e.g., a first portion of data or package of data) may need to be communicated immediately or when the autonomous vehicle is in motion, whereas other data (e.g., a second portion of data or package of data) may be communicated when the autonomous vehicle is stationary (while waiting for the next assignment/task or being maintained). In a further example, a first portion of data may be transmitted to a data center hosting a fleet manager application for providing real-time feedback and control based on real-time data, whereas a second portion of data (e.g., batch data) may be transmitted to an insurance company server to compute insurance coverage based on the batch data. In some embodiments, data delivery or data transmission may be determined based at least in part on a predictive model and/or hand-crafted rules. In some embodiments, data transmission may be initiated based on the predictive model, hand-crafted rules, and repository that stores data about the destination and transmission protocol. In an example, the data orchestrator 100 may support services for data aggregation, and data publishing for sending aggregated data to the cloud, different data centers, or entities for further analysis. Details about the data orchestrator and the predictive model are described later herein.

A predictive model creation and management system 130 may include services or applications that run in the cloud or an on-premises environment to remotely configure and manage the data orchestrator 100. This environment may run in one or more public clouds (e.g., Amazon Web Services (AWS), Azure, etc.), and/or in hybrid cloud configurations where one or more parts of the system run in a private cloud and other parts in one or more public clouds. For example, the predictive model creation and management system 130 may be configured to train and develop predictive models. In some cases, the trained predictive models may be deployed to the data orchestrator or an edge infrastructure through a predictive model update module. Details about the predictive model update module are described with respect to FIG. 15. In some cases, the predictive model creation and management system 130 may also be able to translate machine learning models developed in the cloud into sensor expressions that can be executed at the edge. The predictive model creation and management system 130 may also support ingesting data transmitted from the autonomous vehicle into one or more databases or cloud storages 123, 125, 127. The predictive model creation and management system 130 may include applications that allow for integrated administration and management, including monitoring or storing of data in the cloud or at a private data center. In some embodiments, the predictive model creation and management system 130 may comprise a user interface (UI) module for viewing analytics, sensor data (e.g., video), or comprise a management UI for developing and deploying analytics expressions, deploying data orchestration applications to the edge (e.g., autonomous vehicle operating system, edge gateway, edge infrastructure, data orchestrator), monitoring predictive model performance, and configuring a predictive model. It is noted that although the predictive model creation and management system is shown as a component of the data center, the predictive model creation and management system can be a standalone system.

A model monitor system may monitor data drift or performance of a model in different phases (e.g., development, deployment, prediction, validation, etc). The model monitor system may also perform data integrity checks for models that have been deployed in a development, test, or production environment.

Data monitored by the model monitor system may include data involved in model training and during production. The data at model training may comprise, for example, training, test and validation data, predictions and scores made by the model for each data set, or statistics that characterize the above datasets (e.g., mean, variance and higher order moments of the data sets). Data involved in production time may comprise time, input data, predictions made, and confidence bounds of predictions made. In some embodiments, the ground truth data may also be monitored. The ground truth data may be monitored to evaluate the accuracy of a model and/or trigger retraining of the model. In some cases, users may provide ground truth data to the model monitor system or a model management platform after a model is in production. The model monitor system may monitor changes in data such as changes in ground truth data, or when new training data or prediction data becomes available.

The model monitor system may be configured to perform data integrity checks and detect data drift and accuracy degradation. The process may begin with detecting data drift in training data and prediction data. During training and prediction, the model monitor system may monitor difference in distributions of training data, test, validation and prediction data, change in distributions of training data, test, validation and prediction data over time, covariates that are causing changes in the prediction output, and various others. Alerts on model accuracy may be generated and delivered when new ground data becomes available. The model monitor system may also provide dashboards to track model performance/model risk for a portfolio of models based on the training/prediction data and model registration data collected as part of data drift, accuracy and data integrity checks.

The model monitor system may register information about the model and the data that was used to train/build the model. The model monitor system may define but may not restrict a model to be an artifact created or trained by applying an algorithm to the training data, and then deployed to make predictions against real data. A model may be associated with an experiment and may evolve over time as different data is provided to the model and/or parameters are tuned. The model monitor system may comprise a model ID generator component that generates a model ID (e.g., model_id) uniquely associated with a model. The model ID may be deployment-wide unique and monotonically increasing as described elsewhere herein.

During prediction time, once a model is registered with the model monitor system, predictions may be associated with the model in order to track data drift or to incorporate feedback from new ground truth data.

The model monitor system may allow users to perform data checks. For example, users may perform data checks on the training and prediction data that has been registered with the system. Various data checks may be provided by the model monitor system, including but not limited to, values outside/within a range either in batch mode or across different sliding/growing time windows, data type checks either in batch mode or across different sliding/growing time windows, data distribution hasn't changed at all over time as an indicator that something is suspect, or changes in volume of prediction/training data being registered over time.

The provided data management system may employ any suitable technologies such as container and/or micro-service. For example, the application of the data orchestrator can be a containerized application. The data management system may deploy a micro-service based architecture in the software infrastructure at the edge such as implementing an application or service in a container. In another example, the cloud applications and/or the predictive model creation and management system 130 may provide a management console or cloud analytics backed by micro-services.

Container technology virtualizes computer server resources like memory, central processing unit (CPU), and storage that are managed by an operating system (OS) with negligible overhead without requiring replication of the entire OS kernel for each tenant (and hence unlike a hypervisor technology). Containers were developed as a part of the popular Linux open-source operating system and have gained significant traction in software development and datacenter operations ("DevOps") with the availability of advanced administration frameworks like Docker and CoreOS. Other container orchestration framework such as Kubernetes may also be utilized. Kubernetes provides a high-level abstraction layer called a "pod" that enables multiple containers to run on a host machine and share resources without the risk of conflict. A pod can be used to define shared services, like a directory or storage, and expose it to all the containers in the pod. There is growing demand to consume software and analytics for processing sensor data over nearline compute infrastructure very close to physical sensor networks in the Internet of Things (IoT) use-cases (that include physical locations like factories, warehouses, retail stores, and other facilities). These compute nodes include, for example, servers from medium-size (e.g., a dual-core processor and 4 gigabytes of memory) to miniaturized size (e.g., a single core processor core with less than 1 gigabyte of memory) which are connected to the Internet and have access to a variety of heterogeneous sensor devices and control systems deployed in operations. The data management system provides methods for deploying and managing container technologies intelligently in these edge compute infrastructure settings.

The data center or remote entity 120 may comprise one or more repositories or cloud storage for storing autonomous vehicle data and metadata. For example, a data center 120 may comprise a metadata database 123, a cloud data lake for storing autonomous vehicle stack data 125, and a cloud data lake for storing user experience platform data 127. A user experience platform as described herein may comprise hardware and/or software components that are operating inside of a vehicle's cabin. The user experience platform can be configured to manage the cabin's environment and the occupants' interactions, for example cabin temperature, per occupant entertainment choices, each occupant's vital signs, mood and alertness, etc. In some cases, the metadata database 123 and/or the cloud data lake may be a cloud storage object.

An autonomous vehicle stack may consolidate multiple domains, such as perception, data fusion, cloud/OTA, localization, behavior (a.k.a. driving policy), control and safety, into a platform that can handle end-to-end automation. For example, an autonomous vehicle stack may include various runtime software components or basic software services such as perception (e.g., ASIC, FPGA, GPU accelerators, SIMD memory, sensors/detectors, such as cameras, Lidar, radar, GPS, etc.), localization and planning (e.g., data path processing, DDR memory, localization datasets, inertia measurement, GNSS), decision or behavior (e.g., motion engine, ECC memory, behavior modules, arbitration, predictors), control (e.g., lockstep processor, DDR memory, safety monitors, fail safe fallback, by-wire controllers), connectivity, and I/O (e.g., RF processors, network switches, deterministic bus, data recording). The autonomous vehicle stack data may include data generated by the autonomous stack as described above. The user experience platform data 127 may include data related to user experience applications such as digital services (e.g., access to music, videos or games), transactions, and passenger commerce or services. For example, the user experience platform data may include data related to subscriptions to access content, e.g., an annual subscription to a music streaming service, a news service, a concierge service, etc.; transaction-based purchase of goods, services, and content while being transported, as well as when vehicles intermittently stop, such as at refueling stations, restaurants, coffee shops, etc. (e.g., a recharging station operator, such as an energy company, can partner with a coffee shop chain to offer discounts in coffee drinks to passengers who purchase while refueling a vehicle); and redemption of loyalty points, e.g., automakers and fleet operators can reward their customers for their loyalty, using a system similar to that used by airlines or hotel chains where the loyalty points can be redeemed in much the same way these and other industries use such programs. In some cases, the user experience platform data 127 may also include third-party partner data such as data generated by a user mobile application. A user can be a fleet operator or passenger.

The cloud applications 121, 122 may further process or analyze data transmitted from the autonomous vehicle for various use cases. The cloud applications may allow for a range of use cases for pilotless/driverless vehicles in industries such as original equipment manufacturers (OEMs), hotels and hospitality, restaurants and dining, tourism and entertainment, healthcare, service delivery, and various others. In particular, the provided data management systems and methods can be applied to data related to various aspects of the automotive value chain including, for example, vehicle design, test, and manufacturing (e.g., small batch manufacturing and the productization of autonomous vehicles), creation of vehicle fleets that involves configuring, ordering services, financing, insuring, and leasing a fleet of vehicles, operating a fleet that may involve service, personalization, ride management and vehicle management, maintaining, repairing, refueling and servicing vehicles, and dealing with accidents and other events happening to these vehicles or by a fleet.

Figure 2:
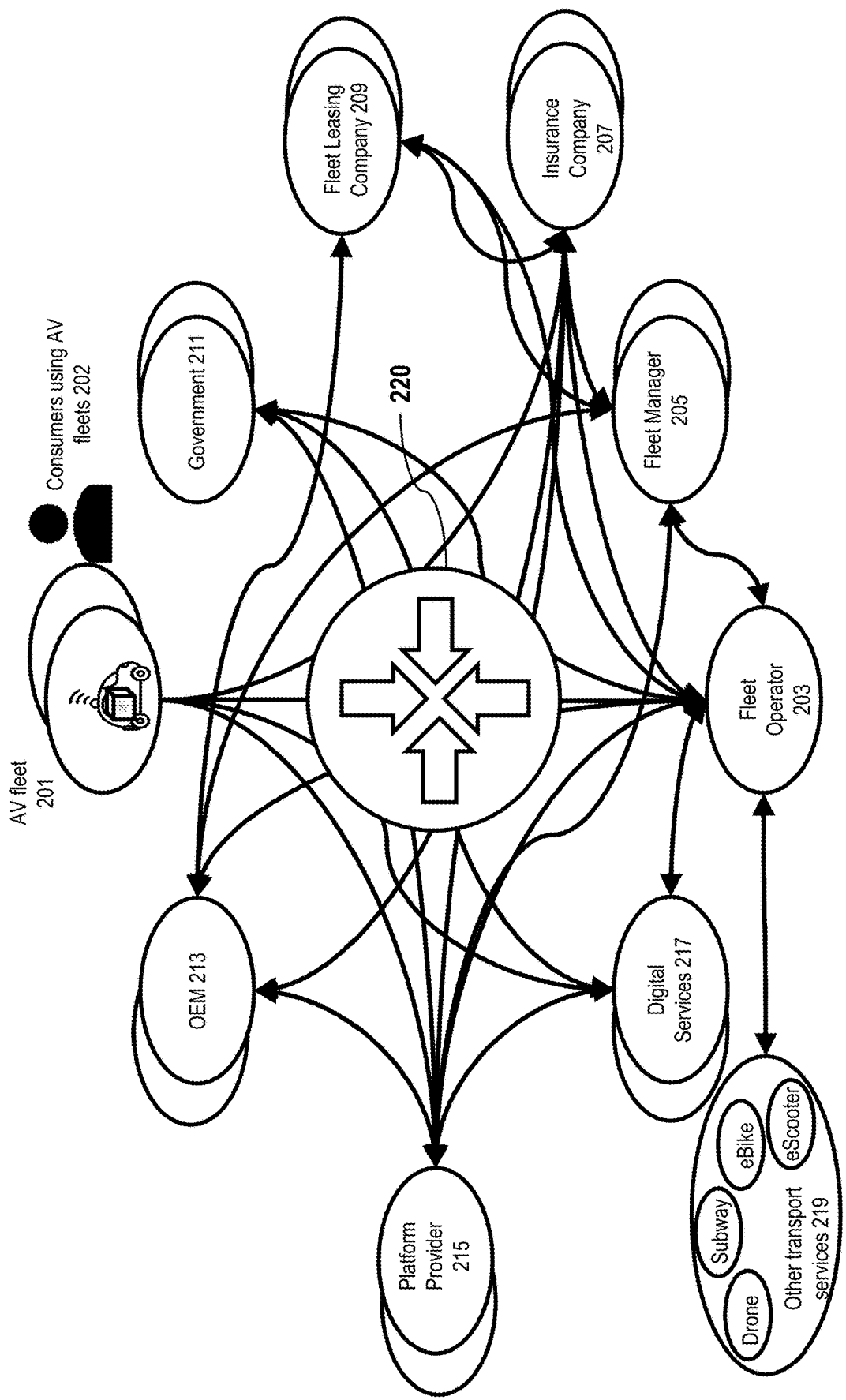
FIG. 2 shows examples of data flows across various data centers, autonomous vehicles and remote entities.

FIG. 2 shows examples of data flows across various data centers, autonomous vehicles, and entities. As shown in the example, data generated during autonomous vehicle fleet (AV fleet) 201 and by consumers using autonomous vehicle fleets 202 may be transmitted to various remote entities with aid of a data orchestrator 220. The various remote entities may include, for example, government 211, fleet leasing company 209, insurance company 207, fleet manager 205, fleet operator 203, digital services 217, other transport services 219 (e.g., such as train and shuttle, ride-sharing, ride-hailing service, shared trip or private trip, walk, bicycle, e-scooter, taxi, etc), platform provider 215, and original equipment manufacturer (OEM) 213. Data transmitted to the various entities may or may not be the same. For instance, data transmitted to digital services 217 (e.g., include more consumer related data or passenger related data) may be different from data (e.g., include more AV fleet data or sensor data) transmitted to fleet operators 203. Data may be transmitted to the various entities at different time points and/or frequency. For instance, sensor data stream may be sent to fleet manager 205 or platform provider 215 in real-time or while the vehicle is in motion, whereas a message package comprising batch data may be sent to government 211 or fleet leasing company 209 while the vehicle is at rest or at lower frequency. In some embodiments, an application repository or Application Table may be used to store information related to data transmission between the vehicle/vehicle application and a remote entity/cloud application. The Application Table may be a component of the data orchestrator described elsewhere herein. In some cases, one or more cloud applications (e.g., cloud applications 121, 122 or tenant applications) running on a cloud or remote entity may register in an Applications Table. The cloud application may be linked to one or more applications (e.g., edge applications, local applications) running on the autonomous vehicle or operating system of the autonomous vehicle. The Application Table may store data related to the specific vehicle data (e.g., type of data, pointer to the data to be transmitted) that a cloud application is interested in, the application (e.g., application running on the autonomous vehicle) that generates the specific vehicle data, applications and/or data centers a specific data is to be transmitted to (e.g., cloud applications 121, 122, location of an application on a server), data transmission scheme or protocol (e.g., timing of transmission such as delay time or frequency, communication protocol, compression or encryption method used for transmission), and various others (e.g., regulatory rules regarding privacy before data is transmitted).

Figure 20:
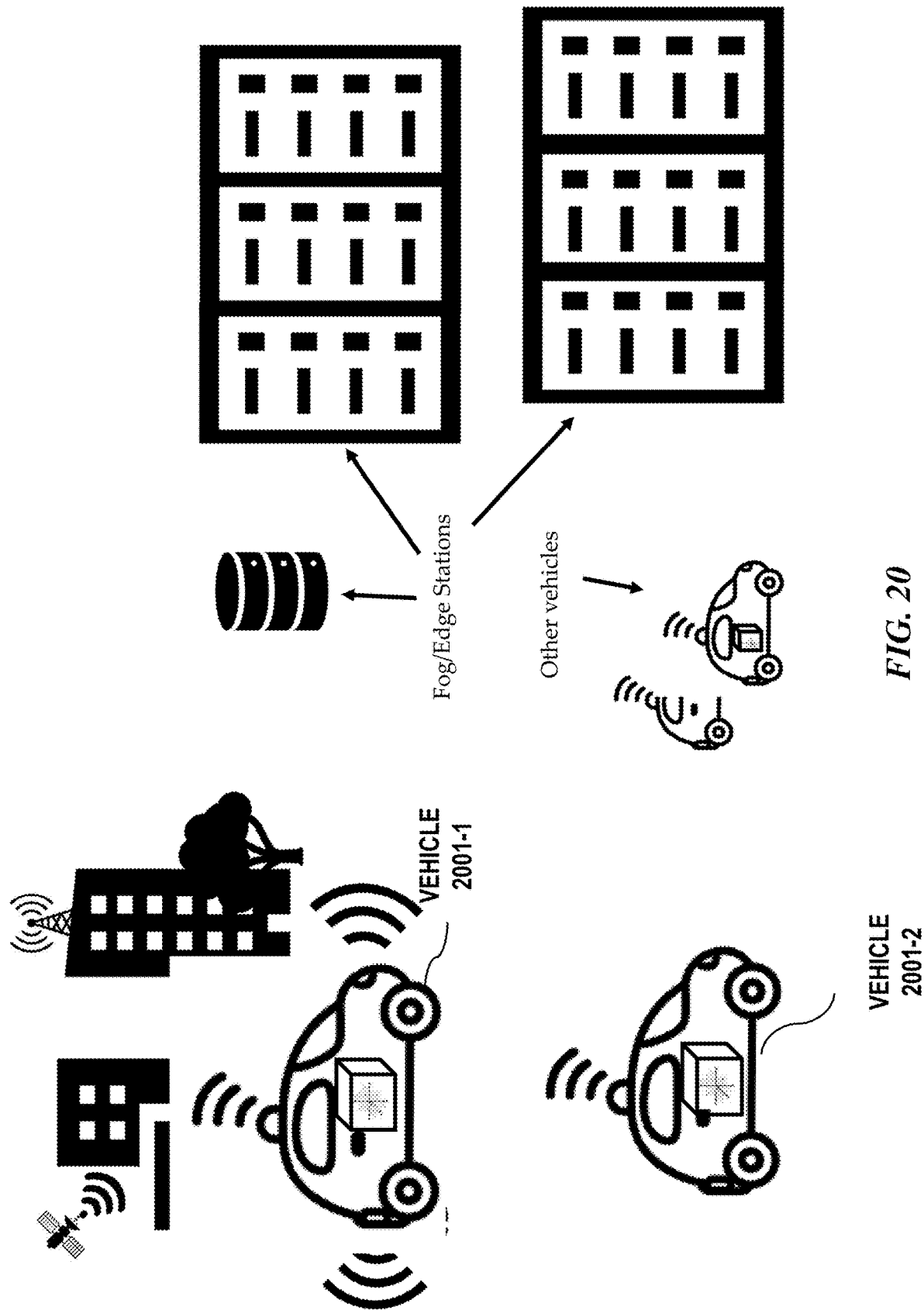
FIG. 20 shows an environment in which the data orchestrator may be implemented.

The data orchestrator 220 may also be part of a connected vehicle, a connected and automated vehicle, or a connected and autonomous vehicle. FIG. 20 shows an environment in which the data orchestrator may be implemented. The vehicle 2001-1, 2001-2 may be privately owned or may be part of a fleet. The vehicle may be used for passenger transportation, long-haul or short-haul logistics, last-mile delivery (e.g., delivery within 5 miles, 4 miles, 3 miles, 2 miles, or 1 mile), or have mixed use (e.g., passengers and packages). It is noted that abovementioned data can be stored as any other suitable data structures. In some cases, the Application Table may be stored in a local storage and managed by the data orchestrator. In addition to or alternatively, the Application Table may be managed by both the data orchestrator and the predictive model creation and management system.

In some cases, the applications running on cloud or a remote entity (e.g., public clouds such as Amazon Web Services (AWS), and Azure, or private cloud) may register in the Application Table of a particular vehicle's data orchestrator (or the data orchestrators of a fleet of vehicles) through a publish/subscribe scheme. In some cases, an application that is running on the fog/edge servers or a remote entity may register in the Applications Table through a publish/subscribe scheme. In some embodiments, a Registering Application may specify the Vehicle IDs from which it needs to receive data and/or the particular Vehicle Application(s) running on the corresponding vehicles it needs to receive data from.

In some embodiments, data requests that are generated by the Registering Applications may be organized and managed by a Cloud's Subscription Module and the data requests may be communicated Over The Air (OTA) to one or more relevant vehicles via a message. A message may include one or more requests for one or more vehicle applications. In some cases, a request included in a message received by a vehicle may be registered in the Application Table. The Subscription Module may be configured to manage the data requests or registering application request. For instance, the Subscription Module may be capable of aggregating multiple registering application requests thereby beneficially reducing communication bandwidth consumption. For example, multiple registering application requests about requesting data from the same vehicle application (e.g., the Pothole Detector application) may be aggregated. In other examples, multiple registering application requests about requesting data from the different vehicle application running on a specific group of vehicles (e.g., all BMW Model 3 vehicles manufactured between 2010-2015) may be aggregated and packaged into a single message.

FIG. 3 shows an example of an Application Table 300. The Application Table 300 may be part of a data orchestrator (sec, e.g., FIG. 4). An entry of the Application Table 300 may store data as described above. For example, a row of the Application Table may include the name of the application (e.g., Pothole detector) that is running in the autonomous vehicle (i.e., vehicle application). The application may generate data to be communicated to a remote entity, data center, or cloud application. A row of the Application Table may also include a flag (e.g., transmission flag) indicating whether new data is available for transmission to one or more applications running in specific data centers, an identifier of the vehicle where the data is generated (e.g., Vehicle ID), a cloud application (e.g., application name, location of the application on the cloud) or data center requesting data from this application and where the data is to be sent (e.g., app_name, loc), the type of data to be transmitted (e.g., video stream, CAN data), a pointer to the actual data (e.g., Stream1) to be transmitted from the vehicle, time of transmission (e.g., transmission timing delay), compression type (e.g., lossless), encryption type (e.g., RSA), and regulation rules. It is noted that the illustrated Application Table is merely an example. Any other data related to data transmission can be included in the Application Table.

In some cases, one or more entries may be set by the local/vehicle application. For example, a transmission flag indicating whether requested data is available for transmission may be set by the local/vehicle application. In some cases, one or more entries may be set by the data orchestrator. For example, vehicle ID or regulatory rules may be set by the data orchestrator.

In some embodiments, the cloud data lakes may organize data around each vehicle in a fleet. For example, data from a particular AV Stack and a particular User Experience Platform may be organized and stored in association with a corresponding vehicle (e.g., Vehicle ID). As described above, a vehicle may register in the cloud data lake and may be identified by its Vehicle ID, the various data-acquisition applications it uses, the sensors that are accessed by each data-acquisition application, the capabilities of each sensor, (e.g., a sensor can capture data every 5 seconds, or a sensor can capture video of 720p resolution) and others. In some cases, a user, an entity in the network, or a party registered to the system may be allowed to automatically derive additional information such as the vehicles, make, model, and year of manufacture of a vehicle using the Vehicle ID. In some cases, a vehicle can be part of a fleet (e.g., a corporate fleet, fleet a car rental company, a collection of privately-owned vehicles made by a specific OEM) which registers with the data management system.

Data Orchestrator

A data orchestrator may be local to or onboard the autonomous vehicle. In some examples, the data orchestrator resides on the autonomous vehicle. As described above, a data orchestrator may also be part of a connected vehicle, a connected and automated vehicle, or a connected and autonomous vehicle. The provided data management system may employ an edge intelligence paradigm that data orchestration is performed at the edge or edge gateway. In some instances, one or more machine learning models may be built and trained on the cloud/data center and run on the vehicle or the edge system (e.g., hardware accelerator).

In some cases, the data orchestrator may be implemented using in part an edge computing platform or edge infrastructure/system. The edge computing platform may be implemented in software, hardware, firmware, embedded hardware, standalone hardware, application specific-hardware, or any combination of these. The data orchestrator and its components, edge computing platform, and techniques described herein may be realized in digital electronic circuitry, integrated circuitry, specially designed ASICs (application specific integrated circuits), computer hardware, firmware, software, and/or combinations thereof. These systems, devices, and techniques may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, and/or device (such as magnetic discs, optical disks, memory, or Programmable Logic Devices (PLDs)) used to provide machine instructions and/or data to a programmable processor.

In some embodiments, the provided data orchestrator may be capable of determining which of the autonomous vehicle data or which portion of the autonomous vehicle data is to be communicated to which data center or third party entity, and when this portion of data is transmitted. The data transmission or data delivery may be determined using the Application Table, rules, and predictive models. The predictive model may be a machine learning-based model.

Machine learning has evolved as a key computation construct in automating discovery of patterns in data and using the models built to make intelligent predictions in a variety of applications. Artificial intelligence, such as machine learning algorithms, may be used to train a predictive model for data orchestration. A machine learning algorithm may be a neural network, for example. Examples of neural networks include a deep neural network, convolutional neural network (CNN), and recurrent neural network (RNN). The machine learning algorithm may comprise one or more of the following: a support vector machine (SVM), a naïve Bayes classification, a linear regression, a quantile regression, a logistic regression, a random forest, a neural network, CNN, RNN, a gradient-boosted classifier or repressor, or another supervised or unsupervised machine learning algorithm.

Figure 4:
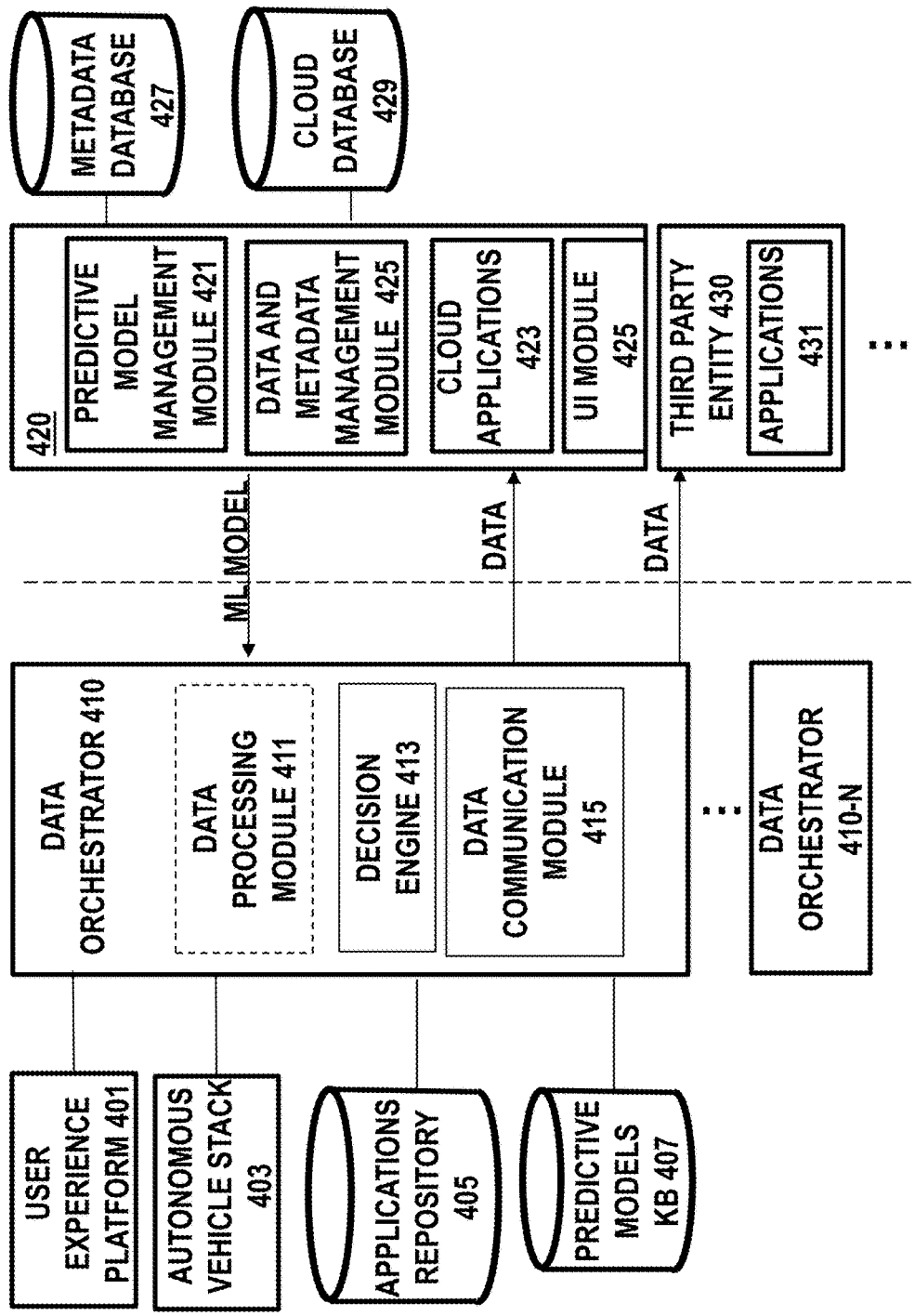
FIG. 4 schematically shows an example of a data orchestrator in communication with one or more remote entities.

FIG. 4 schematically shows an example of a data orchestrator 410 in communication with one or more remote entities 420, 430. In some embodiments, the data orchestrator 410 may comprise a decision engine 413 and a data communication module 415. In some cases, the data orchestrator 410 may optionally comprise a data processing module 411. In some cases, the data processing module 411 may provide pre-processing of stream data and batch data. In alternative embodiments, the data processing module 411 may reside on the cloud 420 such as a component of the data and metadata management module 425. The data orchestrator 410 may be coupled to or have one or more local databases such as an applications repository 405 and/or a predictive models knowledge base 407. The applications repository 405 may store Application Tables as described above. The predictive models knowledge base 405 may be configured to store machine learning models and/or hand-crafted rules for determining a data transmission (scheme). The data transmission scheme may specify which of the autonomous vehicle data to be communicated to which data center or third party entity, and when such data is transmitted. The predictive models knowledge base 405 may store other models in addition to the machine learning models used by the data orchestrator. For example, the predictive models knowledge base 405 may store models that are used for the vehicle's autonomous mobility, models used for personalization of a cabin(s) of the vehicle and other functions performed inside the cabin(s), and/or models used for the safe and optimized operation of a fleet.

The data orchestrator 410 may be in communication with a predictive model management module 421. The predictive model management module 421 can be the same as the predictive model creation and management system 130 as described in FIG. 1. The predictive model management module 421 may reside on a remote entity 420 such as a data center, a cloud, a server, and the like. In some cases, the predictive model management module 421 may include services or applications that run in the cloud or an on-premises environment to remotely configure and manage the data orchestrator 410 over a network. In some cases, the predictive model management module 421 is a standalone system. In some cases, the predictive model management module 421 may be a component of a data center and the data center may host one or more applications 423 that utilize the autonomous vehicle data.

The aforementioned applications repository 405 can be the same as the Application Tables or include the Application Tables as described above.

The predictive models knowledge base 407 may store machine learning models and/or hand-crafted rules. In knowledge-based environments, the availability and leveraging of information, coupled with associated human expertise, is a critical component for improved process, implementation, and utilization efficiencies. A knowledge base provides a plethora of information about a specific subject matter in multiple data sources that can be accessed from global locations with Internet access, or other relevant technologies.

The applications repository 405, predictive models knowledge base 407, one or more local databases, metadata database 427, and cloud databases 429 of the system may utilize any suitable database techniques. For instance, structured query language (SQL) or "NoSQL" database may be utilized for storing the fleet data, passenger data, historical data, predictive model or algorithms. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the data management system may construct the database for fast and efficient data retrieval, query and delivery. For example, the data management system may provide customized algorithms to extract, transform, and load (ETL) the data. In some embodiments, the data management system may construct the databases using proprietary database architecture or data structures to provide an efficient database model that is adapted to large scale databases, is easily scalable, is efficient in query and data retrieval, or has reduced memory requirements in comparison to using other data structures. For example, a model tree may be stored using a tree data structure with nodes presenting different versions of a model and node parameters representing a model's goal, performance characteristics and various others.

Figure 18:
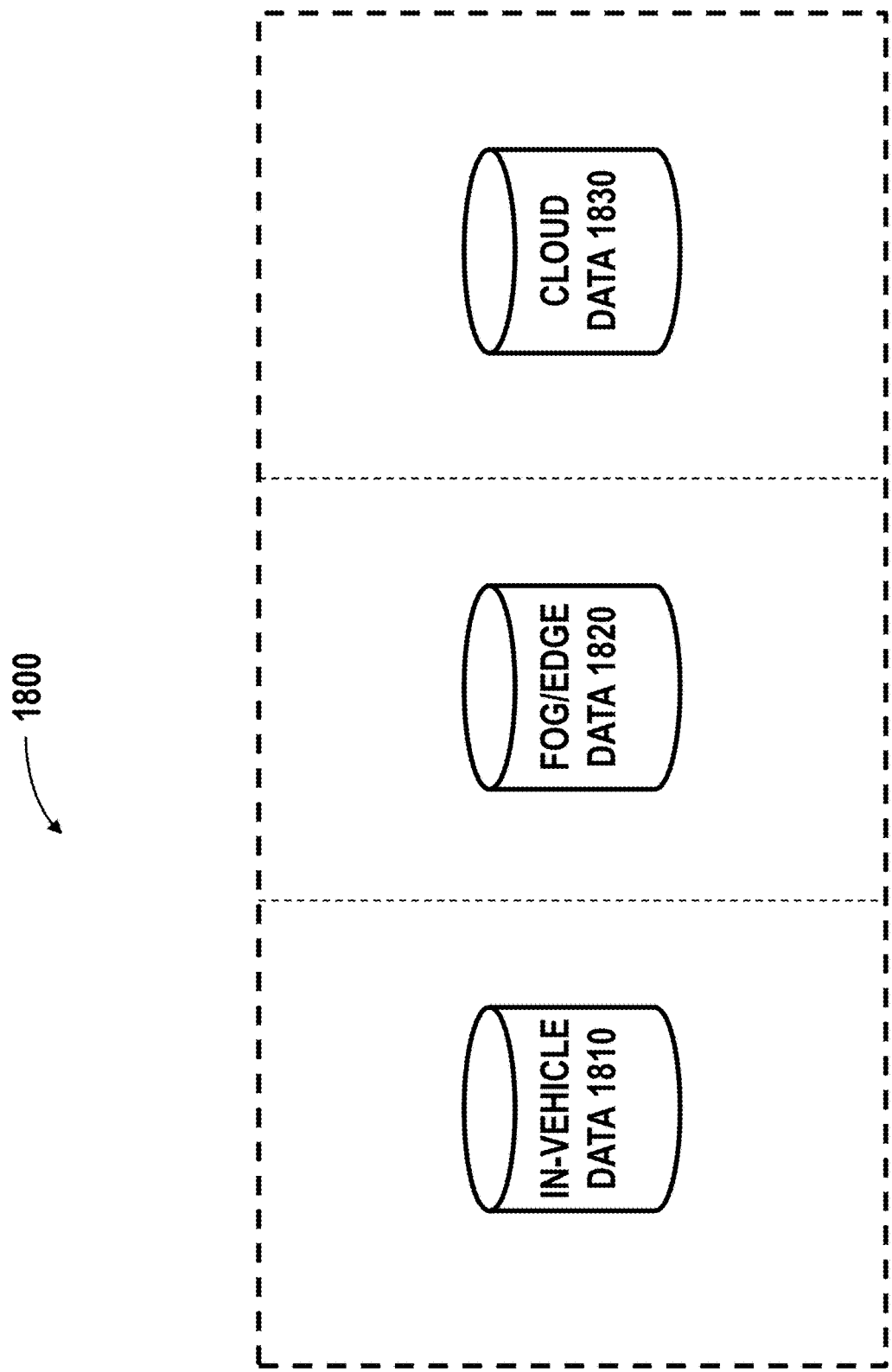
FIG. 18 schematically illustrates a multi-tier data architecture.

In some embodiments, the data orchestrator may be applied to a multi-tier data architecture. FIG. 18 schematically illustrates a multi-tier data architecture 1800. In the illustrated example, the data orchestrator may be a software-based solution based on fog or edge computing concepts as described above. In some cases, the multi-tier data architecture may comprise a vehicle layer (e.g., in-vehicle data 1810), a fog layer (e.g., fog/edge data 1820) and a cloud layer (e.g., cloud data 1830). The multi-tier data architecture may comprise any number of layers. For instance, a fog layer may comprise one or more layers. Data at the vehicle layer may comprise in-vehicle data 1810 generated by the user experience platform 401 and/or the vehicle stack 403, sensors onboard the vehicle, and various other sources as described elsewhere herein. Data at the vehicle layer may be the same as the autonomous vehicle data as described above. Data at the fog layer (e.g., fog/edge data 1820) may be generated, managed and directly accessed by the data orchestrator. The fog/edge data 1820 may comprise data after processed by the data processing module 411. The data processing module 411 may support ingesting of sensor data into a local storage repository (e.g., local time-series database), data cleansing, data enrichment (e.g., decorating data with metadata), data alignment, data annotation, data tagging, data aggregation, and various other data processing. The fog/edge data 1820 may also comprise intermediary data to be transmitted to the cloud according to a transmission scheme.

The data orchestrator may be configured to or capable of determining which of the vehicle data or which portion of the vehicle data stays in the in-vehicle database, is to be moved/transmitted to the fog layer database (e.g., fog/edge database), and which of the fog/edge data or which portion of the fog/edge data is to be communicated to which data center or third party entity, when and at what frequency this portion of data is transmitted. In some cases, data that is off-loaded or moved to the edge/fog database may be deleted from the in-vehicle database for improved storage efficiency. Alternatively, data in the in-vehicle database may be preserved for a pre-determined period of time after it is off-loaded to the edge/fog database.

Figure 19:
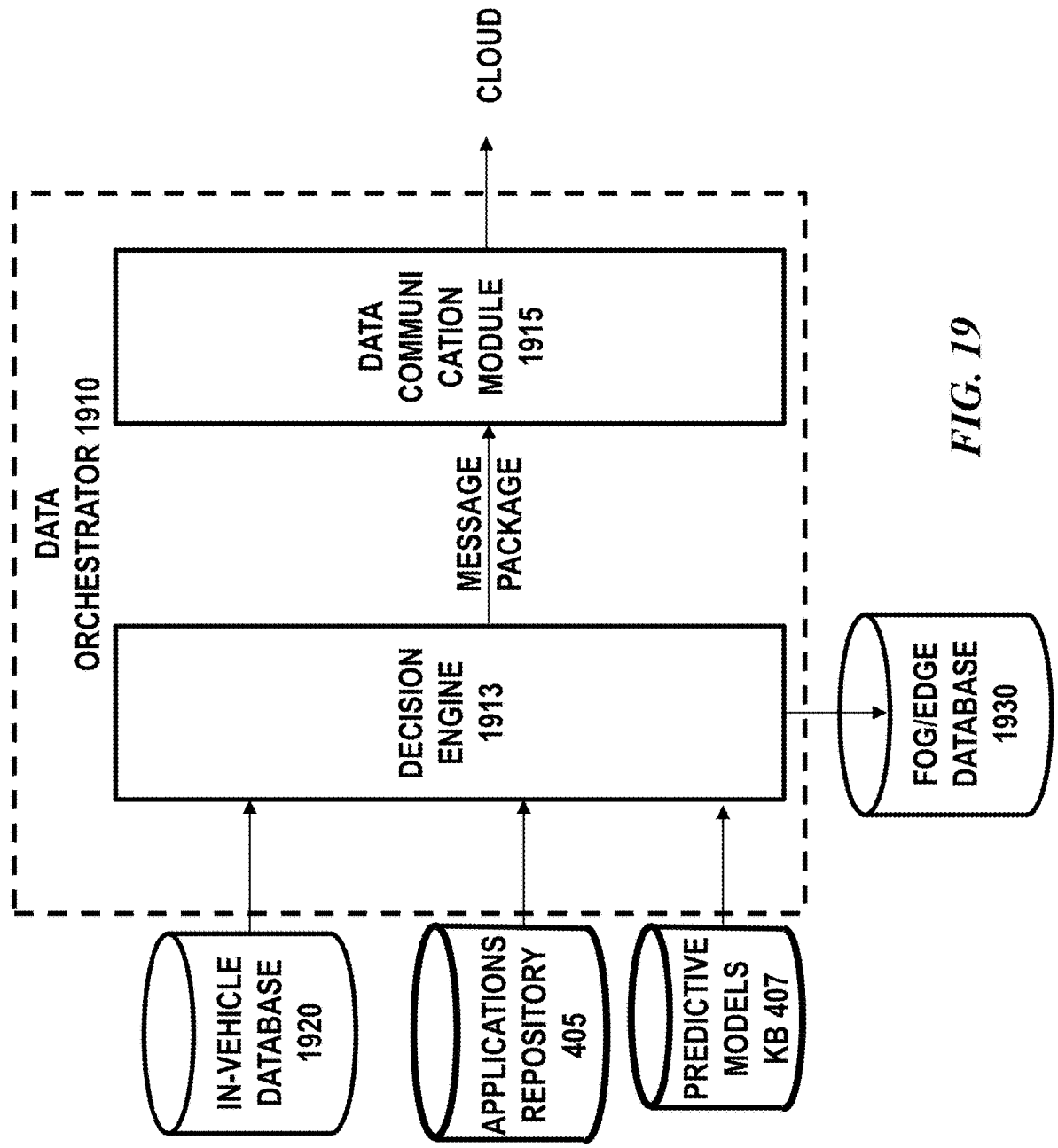
FIG. 19 schematically shows an example of a data orchestrator for managing data transmission between a vehicle layer and fog layer, and between the fog layer and a cloud layer.

FIG. 19 schematically shows an example of a data orchestrator 1910 for managing data transmission between a vehicle layer and fog layer, and between the fog layer and a cloud layer. The data transmission or data delivery among the multiple layers may be determined using the Application Table, rules, and predictive models. The predictive model may be a machine learning-based model as described above.

The data orchestrator 1910 can be the same as the data orchestrator 410 as described above. For example, the data orchestrator 1910 may comprise a decision engine 1913 and a data communication module 1915. In some cases, the data orchestrator 1910 may optionally comprise a data processing module (not shown). In some cases, the data processing module may provide pre-processing of stream data and batch data transmitted from the in-vehicle database 1920. The in-vehicle database 1920 may be on-board a vehicle and store vehicle data (e.g., in-vehicle data 1810). The data orchestrator may manage data transmission between an in-vehicle database 1920 and a fog/edge database 1930, and between a fog/edge database 1930 and a cloud database.

The data orchestrator 1910 may be coupled to or have one or more local databases such as an applications repository 405 and/or a predictive models knowledge base 407 as described above. The applications repository 405 may store Application Tables as described above. The predictive models knowledge base 405 may be configured to store machine learning models and/or hand-crafted rules for determining a data transmission (scheme). The data transmission scheme may specify which of the vehicle data or which portion of the vehicle data stays in the in-vehicle database 1920, is to be moved/transmitted to the fog layer database (e.g., fog/edge database 1930), and when and/or at what frequency such data is transmitted. The data transmission scheme may also specify which of the fog/edge data or which portion of the fog/edge data is to be communicated to which data center or third-party entity, when and at what frequency this portion of data is transmitted. The predictive models knowledge base 405 may store other models in addition to the machine learning models used by the data orchestrator. In some cases, the predictive models knowledge base 405 may not or need not be the same as the knowledge base of the system which may store models that are used for the vehicle's autonomous mobility, models used for personalization of a cabin(s) of the vehicle and other functions performed inside the cabin(s), and/or models used for the safe and optimized operation of a fleet.

Figure 5:
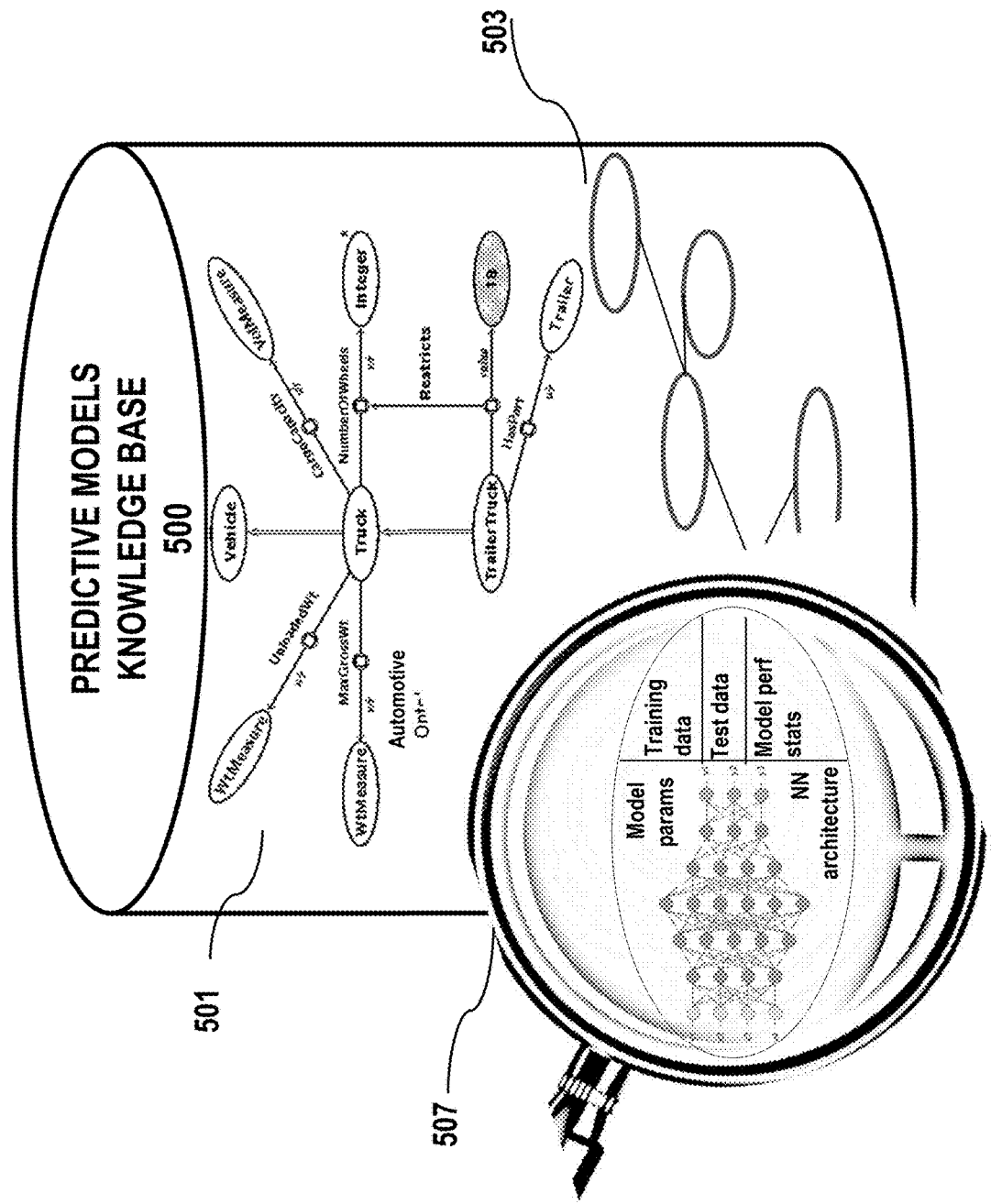
FIG. 5 illustrates an example of a predictive models knowledge base.

FIG. 5 illustrates an example of a predictive models knowledge base 500. In some embodiments, a predictive models knowledge base 500 may comprise an Automotive Ontology 501 and one or more model trees 503. In some embodiments, the predictive models knowledge base may include both hand-crafted rules and machine learning-based predictive models. The hand-crafted rules and machine learning-based predictive models may independently or collectively determine rules or protocols regulating data transmission. For example, the rules may specify applications and/or data centers a given aggregation of data (e.g., Message_package) is to be transmitted to, the aggregation of data to be transmitted, data transmission scheme (e.g., timing of transmission such as delay time or frequency, communication protocol, compression or encryption method used for transmission), and various others (e.g., regulatory rules regarding privacy before data is transmitted).

The hand-crafted rules may be imported from external sources or defined by one or more users (e.g., the hand-crafted rules may be user-defined rules). In some cases, the hand-crafted rules may be provided by a remote application that requests data from the vehicle. In some cases, a data transmission scheme may be determined based on a request from a remote application. In some cases, the request may be a request sent from a remote third-party application (e.g., application 423, 430) to an intermediary component (e.g., original equipment manufacturer (OEM)). For instance, an insurance application may request certain type of data from an OEM system associated with a vehicle (e.g., data collected by OEM-embedded devices) at a pre-determined frequency (e.g., a week, two weeks, a month, two months, etc.) for purpose of understanding whether the driver may be driving excessively compared to the insurance rate he is paying, creating new insurance products, providing discounts to drivers for safety features, assessing risk, accident scene management, first notice of loss, enhancing claims process and the like.

The request may contain information about the type of data needed by the application, the frequency with which the data are needed, a period of time for such type of data to be transmitted or other information. In some situations, when the data transmission is infrequent or the amount of data to be transmitted is relatively small, a data transmission scheme may be generated based on the aforementioned request without using an intelligent transmission scheme such as one that can be created using the machine learning models. For instance, a requesting application (e.g., insurance application) may send to the OEM system associated with a target vehicle (or group of vehicles) a request indicating the type of data and the frequency of such data are needed from the target vehicle. In some cases, the request may specify a group of vehicles. For instance, the request may specify a particular model (e.g., Audi A8), a model year (e.g., 2017), a model with specific driving automation features (e.g., A8 with lane change monitor), and the like. The OEM system may pass the request (e.g., send a request message to relay the request) to the data orchestrator of the respective target vehicle. Upon receiving the request, the data orchestrator may push the request to a queue and send back a response message to the OEM system to acknowledge receipt of the request. The OEM system may then send a message to the requesting application indicating the request has been logged.

Next, the data orchestrator may transmit the requested data based on the information contained in the request. The data orchestrator may send the requested data directly to the requesting application. In such cases, information related to data transmitted from the data orchestrator to the remote application (e.g., requesting application) may be communicated through an intermediary entity (e.g., OEM system). For example, in addition to passing the request/response message, the OEM system/application may send a message to the data orchestrator instructing the data orchestrator to delete the transmission request from the queue when a transmission period is completed (e.g., upon receiving a completion message from the data orchestrator). The data orchestrator may then delete the entry from the queue and send a message to the OEM system indicating the entry is deleted. The OEM system may send a message to the requesting application indicating the request is completed.

The predictive models knowledge base 500 may store other models in addition to the machine learning models used by the data orchestrator. For example, the predictive models knowledge base 500 may store models that are used for the vehicle's autonomous mobility, models used for cabin(s) personalization and other functions performed inside the vehicle and/or a cabin(s) of the vehicle, and/or models used for the safe and optimized operation of a fleet. Models stored in the predictive models knowledge base 500 may include predictive models used by the data orchestrator, predictive models that are being used by the Autonomous Vehicle Stack, models that are used by the user experience platform, or a fleet management system. Alternatively, predictive models that are being used by the Autonomous Vehicle Stack, and models that are used by the user experience platform may be stored in a predictive models knowledge base managed by the respective Autonomous Vehicle Stack or the user experience platform separately.

The Automotive Ontology 501 can be developed manually by one or more individuals, organizations, imported from external systems or resources, or may be partially learned using machine learning systems that collaborate with users (e.g., extracting automotive terms from natural language text). In some cases, a portion of the Automotive Ontology may be based on data from the model tree. For example, description of a goal and/or insight of a model may be stored in a node of the model tree whereas the description of the goal and/or insight may also be a part of the Automotive Ontology.

The predictive models knowledge base 500 may store other ontologies or models. In some cases, scenario metadata may be created to specify the characteristics of the scenario using a specific metadata which is then used to retrieve the appropriate vehicle data from the database. The predictive models knowledge base may include hierarchical scenarios ontology that can be used to create new scenarios as well as to create a scenario in various levels of details. For instance, a scenario described at a higher level of detail (i.e., higher level information about the scenario), may be used to create a low-fidelity simulation or predictive model, whereas the same scenario described at a lower level of detail (i.e., more detailed lower level information about the scenario) may be used to produce a high-fidelity simulation or predictive model.

The one or more model trees 503 may be a collection of tree structures. A tree structure may comprise one or more nodes 507 with each node including the characteristics of a predictive model and pointers to the data (e.g., training data, test data) that are used to generate the predictive model. The actual data (e.g., training data, test data) may be stored in the cloud database 429. The cloud database 429 can be the same as the cloud data lakes 125, 127, or include either of or both the cloud data lakes 125, 127. The hierarchy of nodes in a given model tree may represent the versions of a particular predictive model and the relationships between the models. The characteristics of a predictive model may include, for example, a predictive model's goal/function, model performance characteristics and various others. A node 507 may also store model parameters (e.g., weights, hyper-parameters, etc.), metadata about the model parameters, a model's performance statistics, or model architecture (e.g., number of layers, number of nodes in a layer, CNN, RNN). In some cases, a node 507 may further include information about the computational resource(s) (e.g., one graphics processing unit (GPU), two GPUs, three CPUs, etc.) required to execute a model. A node may include all or any combination of the data as described above.

In some cases, the various predictive models may be stored using different model tree structures. A knowledge base may have different model tree structures depending on, for example, where the predictive models are being used. For example, the model tree structure for storing the predictive model used by a user experience platform may be different from the model tree structure storing the predictive model used by the data orchestrator.

The model tree may be dynamic. For example, a new node may be created in response to changes to the model's original architecture, changes to the model's performance characteristics, or changes to the training data, or test data.

In some cases, the predictive model knowledge base may also store hand-crafted rules. The hand-crafted rules can be developed manually by one or more individuals, organizations, or imported from external systems or resources. The hand-crafted rule and the predictive model may be applied independently, sequentially or concurrently.

Below shows an example of a rule regarding data transmission in accordance with the Application Table described in FIG. 3:

```
If the Transmission_Flag of the Pothole_Detector_App is Set
Then
Determine when the data must be transmitted
For each Vehicle_ID with Transmission_Flag=SET
Receive the video stream from the vehicle
Apply all applicable regulation rules
Encrypt the data set that results after applying the applicable regulatory rules and creating the
Enrypted_Data_File
Compress the Enrypted_Data_File creating the Compressed_Data_File
Create a Message_Package consisting of [Compressed_Data_File, File_Size, Transmission_Delay,
Data_Center_Address_List]
Send the Message_Package to the Communication-Module queue
```

In some embodiments, the data transmission scheme may also specify how data are transmitted. For instance, the data transmission scheme may specify compression methods (e.g., lossless compression algorithm, lossy compression algorithms, encoding, etc.), or encryption methods (e.g., RSA, triple DES, Blowfish, Twofish, AES, etc.) used for transmission. In some cases, a data compression method and/or encryption method may be determined for a transmission based on rules. For example, a rule may determine the compression method and/or encryption method according to a given type of data, the application that uses the data, destination of the data and the like. The rules for determining data compression method and/or encryption method may be stored in a database accessible to the data orchestrator such as the predictive models knowledge base as described above. In some cases, the rule for determining the data compression method and/or encryption method may be part of the rule for determining the data transmission. For instance, a ruleset for determining the encryption method or compression method may be called (e.g., by ruleset identifier) for determining the data transmission scheme.

The rules for determining the compression method and/or encryption method may be hand-crafted rules. For example, pre-determined or hand-crafted rules about compression method and/or encryption method may be applied upon receiving a transmission request specifying the type of data, data related to an application, destination of data, and the like. Such hand-crafted rules may be stored in a database accessible to the data orchestrator such as the predictive models knowledge base as described above. In some cases, the compression method and/or encryption method may be determined by machine learning algorithm trained models. For instance, when a pre-determined rule set for data compression or encryption is not available (e.g., ruleset identifier is not available, type of dataset is not seen before, etc.), the trained model may be applied to the set of data to be transmitted and generate a rule for compressing or encrypting the set of data. In some cases, the rule set generated by the trained model may be stored in the predictive models knowledge base for future data transmission (scheme).

Referring back to FIG. 4, the data processing module 411 may support ingesting of sensor data into a local storage repository (e.g., local time-series database), data cleansing, data enrichment (e.g., decorating data with metadata), data alignment, data annotation, data tagging, data aggregation, and various other data processing. Data from the user experience platform 401 and/or the vehicle stack 403, sensors onboard the vehicle, and various other sources as described elsewhere herein may be ingested and processed by the data processing module. For instance, the data processing module may collect or ingest data from the sensors via one or more protocols (e.g., MQ Telemetry Transport, OPC Unified Architecture, Modbus, and DDS). The data provided or outputted by the sensors may be a binary data stream. The transmission or delivery of this data from the sensors to the data processing module can be push or pull methods. In some cases, the data processing module may enrich the incoming data from the sensors by decoding the raw binary data into consumable data formats (such as JavaScript Object Notation) or also merging with additional necessary and useful metadata. In some embodiments, metadata may relate to sensors that capture sensory data (e.g., GPS, Lidar, camera, etc.), pre-processing on data (e.g., aligning and creating time series), and various applications and/or predictive models that operate on the data for a specific use case or application (e.g., avoiding pedestrians, pattern recognition, obstacle avoidance, etc). Alternatively, such data processing may be performed by an application on the cloud. For example, the data processing module 411 may reside on the cloud 420 rather than the data orchestrator. Details about the data processing method and metadata creation are described later herein.

The decision engine 413 may be configured to execute rules in the predictive models knowledge base 407. For example, the decision engine may constantly look up for rules in the predictive models knowledge base 407 eligible or ready for execution, then execute the action associated with the eligible rules and invoke the data communication module 415 to transmit the results (e.g., aggregated data, Message_Package) to the destination (e.g., requested data center 420, application 431, remote entity, third party entity 431, etc).

The data communication module 415 may send processed data or a selected portion of the autonomous vehicle data to a destination in compliance with the rules. Below shows an example of a procedure performed by the data communication module:

```
Step 1 Check Queue_Status
Step 2 If the Queue_Status=1 Then
    For every Message_Package
        Examine File_Size and Transmission_Delay to determine
Transmission_Channel_Type
        Select Transmission_Channel of Transmission_Channel_Type
        Send Compressed_Data_File over selected Transmission_Channel to each address in
```

```
Data_Center_Address_List
    If Transmission_Succeess=1 Then Delete Message_Package from Queue Else GoTo
Send
Step 3 Goto Step 1
```

Various communication protocols may be used to facilitate communication between the data orchestrator and the cloud or remote entity. These communication protocols may include VLAN, MPLS, TCP/IP, Tunneling, HTTP protocols, wireless application protocol (WAP), vendor-specific protocols, customized protocols, and others. While in one embodiment, the communication network is the Internet, in other embodiments, the communication network may be any suitable communication network including a local area network (LAN), a wide area network (WAN), a wireless network, an intranet, a private network, a public network, a switched network, and combinations of these, and the like. The network may comprise any combination of local area and/or wide area networks using both wireless and/or wired communication systems. For example, the network may include the Internet, as well as mobile telephone networks. In one embodiment, the network uses standard communications technologies and/or protocols. Hence, the network may include links using technologies such as Ethernet, 802.11, worldwide interoperability for microwave access (WiMAX), 2G/3G/4G or Long Term Evolution (LTE) mobile communications protocols, Infra-Red (IR) communication technologies, and/or Wi-Fi, and may be wireless, wired, asynchronous transfer mode (ATM), InfiniBand, PCI Express Advanced Switching, or a combination thereof. Other networking protocols used on the network can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above. The network may be wireless, wired, or a combination thereof.

Predictive Model Creation and Management System

The predictive model management module 421 can be the same as the predictive model creation and management system as described in FIG. 1. The predictive model management module 421 may include services or applications that run in the cloud or on-premises environment to remotely configure and manage the data orchestrator 410 or one or more components of the data orchestrator (e.g., predictive models knowledge base).

In some embodiments, the predictive model management module 421 may comprise a model creator and a model manager. In some cases, a model creator may be configured to train, develop or test a predictive model using data from the cloud data lake and metadata database. The model manager may be configured to manage data flows among the various components (e.g., cloud data lake, metadata database, data orchestrator, model creator), provide precise, complex and fast queries (e.g., model query, metadata query), model deployment, maintenance, monitoring, model update, model versioning, model sharing, and various others. For example, the deployment context may be different depending on edge infrastructure and the model manager may take into account the application manifest such as edge hardware specifications, deployment location, information about compatible systems, data-access manifest for security and privacy, emulators for modeling data fields unavailable in a given deployment and version management during model deployment and maintenance.

Figure 14:
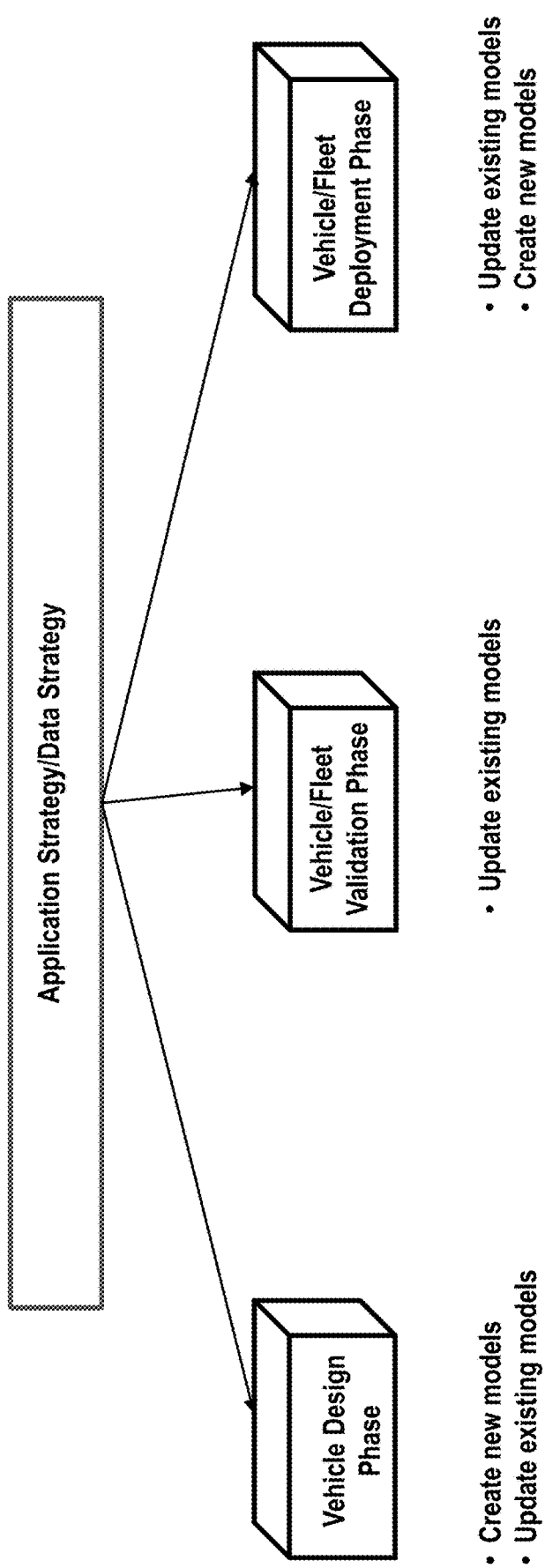
FIG. 14 shows examples of varieties of applications in a lifecycle of automated and autonomous vehicles.

The data management provided by the predictive model management module can be applied across an entire lifecycle of the automated and autonomous vehicles. For example, the data management may be applied across a variety of applications in the vehicle design phase, vehicle/fleet validation phase or the vehicle/fleet deployment phase. FIG. 14 shows examples of varieties of applications in a lifecycle of automated and autonomous vehicles. For instance, data management can be used in creating new models or updating existing models in the vehicle design phase, in the vehicle/fleet validation phase, or in the vehicle/fleet deployment phase.

Figure 6:
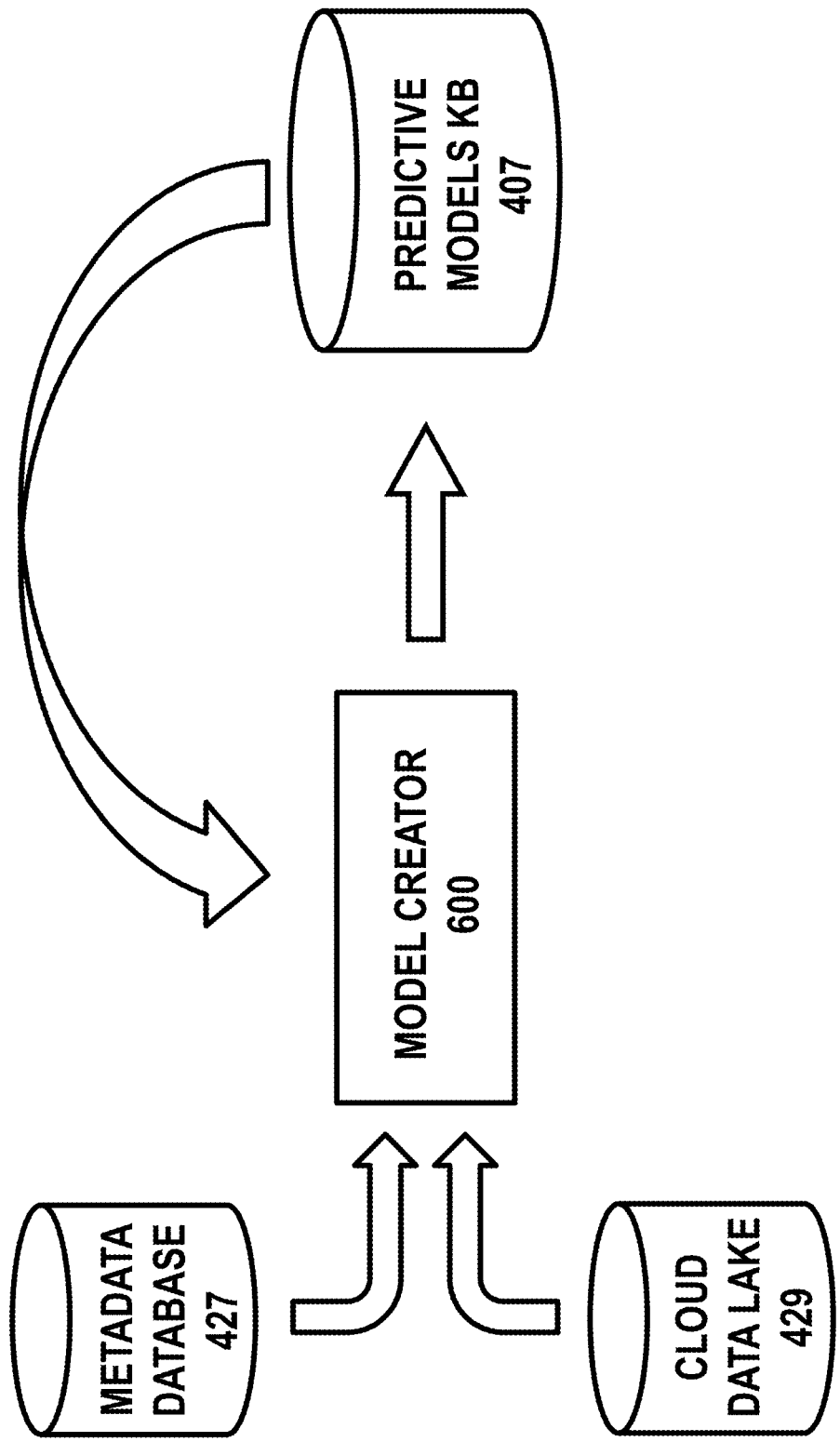
FIG. 6 shows an example of a model creator interacting with a metadata database and cloud data lakes for training and developing a predictive model.

FIG. 6 shows an example of a model creator 600 interacting with a metadata database 427 and a cloud data lake 429 for training and developing a predictive model. The trained predictive model may be tested for performance, then the predictive model meets the performance requirement may be inserted into the predictive model knowledge base 407. In some embodiments, the cloud database 429 may include both cloud data lakes 125, 127 as described in FIG. 1.

The model creator may be configured to develop predictive models used by the data orchestrator, predictive models that are being used by the Autonomous Vehicle Stack, predictive models that are used by the user experience platform, by a fleet management system and various others. The model creator may train and develop predictive models that are used for the vehicle's autonomous mobility, for vehicle cabin(s) personalization and other functions performed inside the vehicle and/or vehicle cabin(s), for the safe and optimized operation of a fleet, and/or various other applications in addition to data management and data orchestration.

Figure 7:
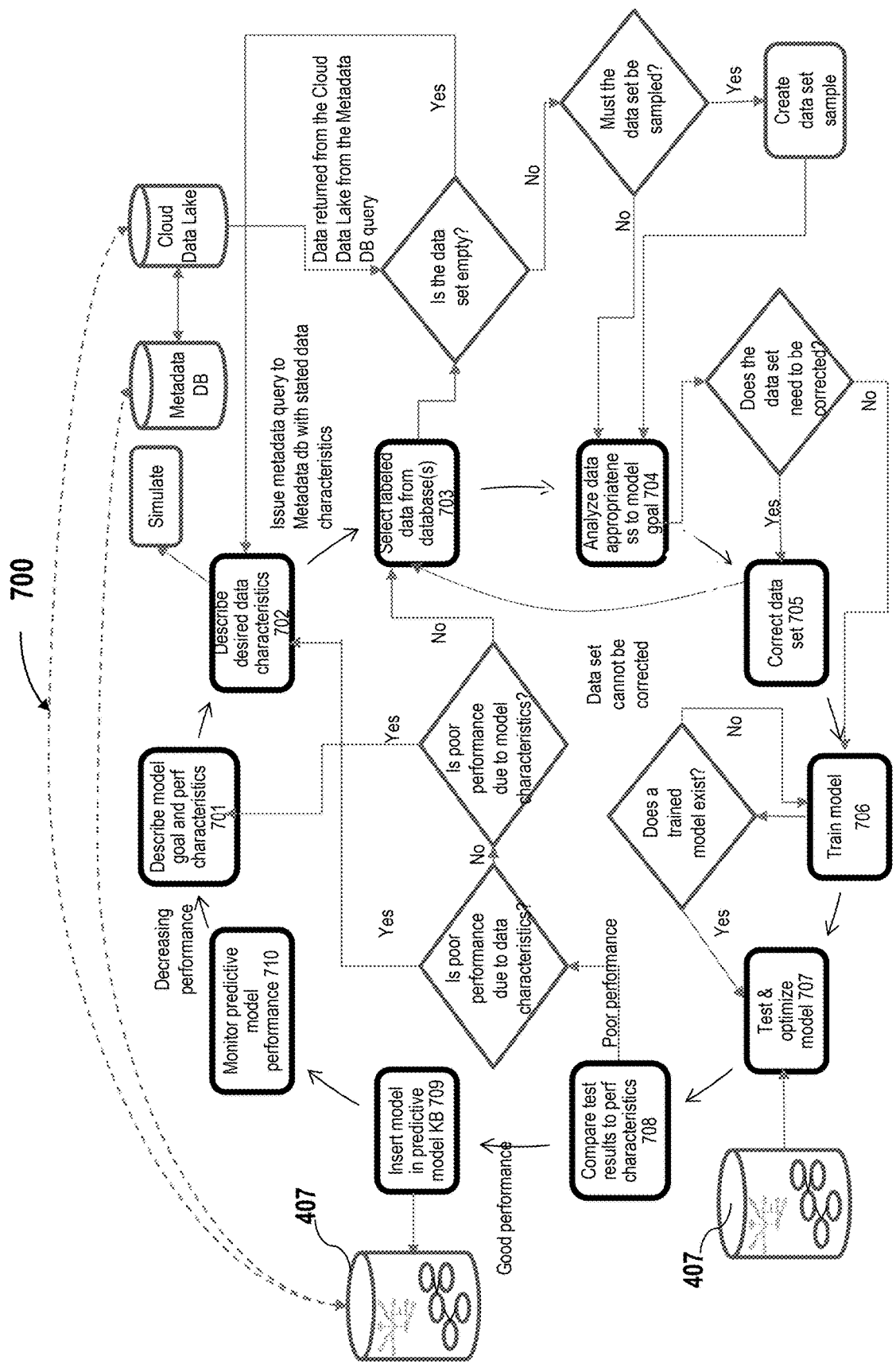
FIG. 7 illustrates a method of creating a predictive model.

FIG. 7 illustrates a method 700 of creating a predictive model. The method or process may be performed by the model creator as described above. In order to generate a predictive model, model goals and performance characteristics (e.g., accuracy) may be determined (operation 701). Additionally, desired data characteristics (e.g., completeness, validity, accuracy, consistency, availability and timeliness) may be determined (operation 702). Next, labeled data or datasets may be selected from the database (e.g., the cloud data lake) for training the model (operation 703). In some cases, retrieving data from the database may include querying metadata within the metadata database with the data characteristics, then retrieving data from the cloud data lake based on the metadata query result. If no data is returned from the cloud data lake, data characteristics may be adjusted (i.e., repeat operation 702). In some cases, the returned data or dataset may be sampled prior to the next step.

In some cases, the labeled data or dataset may be analyzed for appropriateness in view of the model goal (operation 704). For example, the labeled dataset may be determined whether is sufficient for the predictive goal, e.g., developing a predictive model that enables an autonomous vehicle to make right-hand turns automatically. Various suitable methods can be utilized to determine the appropriateness of the labeled dataset. For example, statistical power may be calculated and used for the analysis. Statistical power is the likelihood that a study will detect an effect when there is an effect there to be detected. If statistical power is high, the probability of making a Type II error, or concluding there is no effect when, in fact, there is one, goes down. Statistical power is affected chiefly by the size of the effect and the size of the sample used to detect it. Bigger effects are easier to detect than smaller effects, while large samples offer greater test sensitivity than small samples.

The analysis result produced at operation 704 may determine whether the dataset need to be corrected. The result of the appropriateness analysis may indicate whether the dataset meet the appropriate requirement, a level of appropriateness, or whether need to be corrected. For example, when the appropriateness of the labeled dataset is calculated and is below a pre-determined threshold, the dataset may be determined to not meet the appropriateness requirement and may need correction. Upon determining the dataset does not need correction, the dataset may be used for training the predictive model (operation 706). In some cases, training a model may involve selecting a model type (e.g., CNN, RNN, a gradient-boosted classifier or repressor, etc), selecting an architecture of the model (e.g., number of layers, nodes, ReLU layer, etc), setting parameters, creating training data (e.g., pairing data, generating input data vectors), and processing training data to create the model. In some cases, if the dataset is analyzed and determined to need data correction, correction may be performed (operation 705). In the case when the dataset cannot be corrected, a new or different dataset may be selected from the database (i.e., repeating operation 703).

A trained model may be tested and optimized (operation 707) using test data retrieved from the predictive model knowledge base 407. Next, the test result may be compared against the performance characteristics to determine whether the predictive model meet the performance requirement (operation 708). If the performance is good i.e., meets the performance requirement, the model may be inserted into the predictive model knowledge base 407 (operation 709).

In some cases, inserting a new model into the predictive model knowledge base may include determining where the new model is inserted in the model tree (e.g., added as a new node in an existing model tree or in a new model tree). Along with the new model, other data such as model goal, model architecture, model parameters, training data, test data, model performance statistics may also be archived in the model tree structure. Next, the predictive model performance may be constantly monitored by the model creator or model manager (operation 710). If the trained model does not past the performance test, the process may proceed to determine whether the poor performance is caused by the data characteristics or the model characteristics. Following the decision, operation 701 (e.g., adjusting performance characteristics) and/or operation 702 (e.g., adjusting data characteristics) may be repeated.

Figure 15:
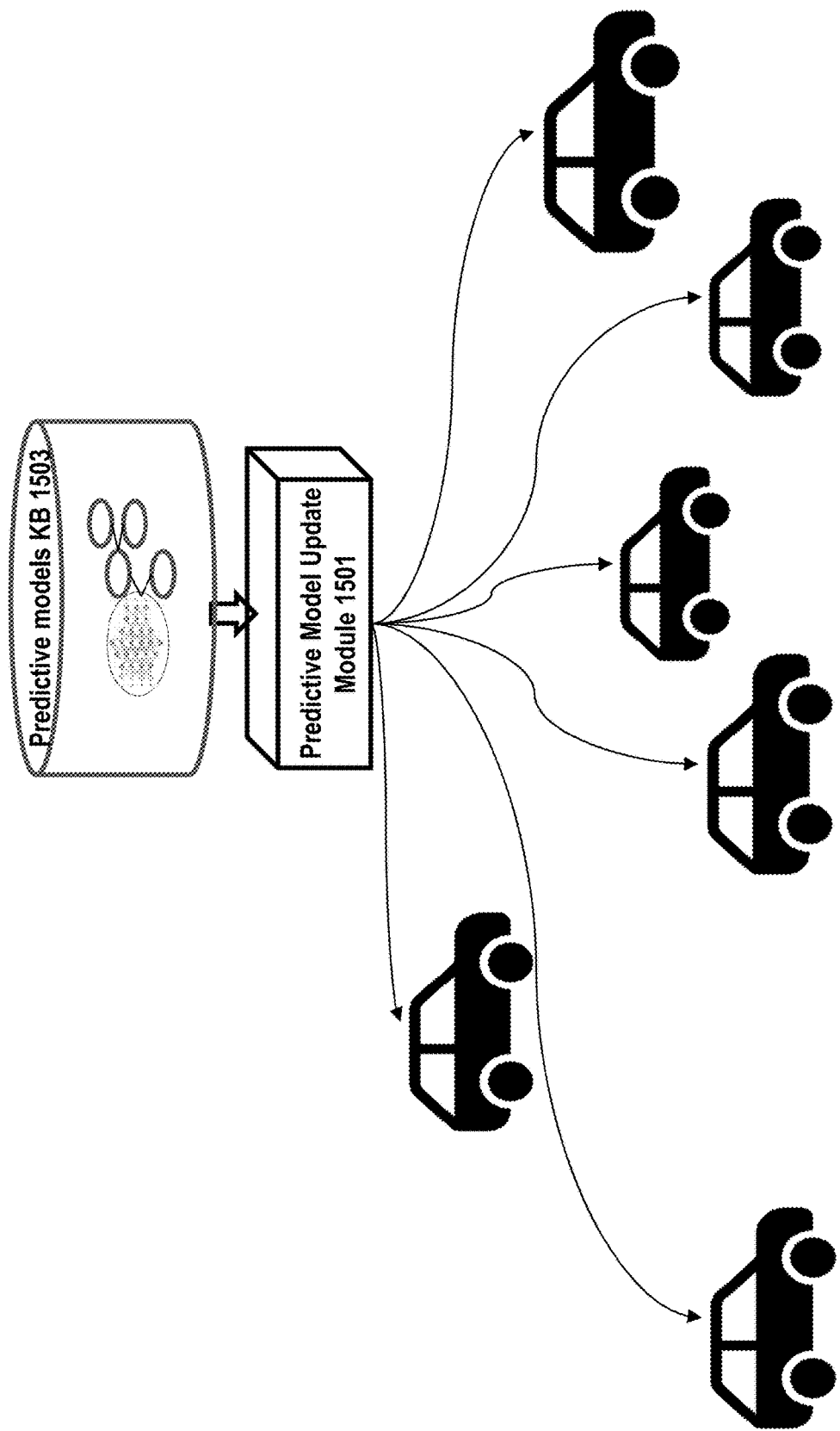
FIG. 15 illustrates an example of dynamically updating predictive models in vehicles.

In some cases, upon the creation of a new predictive model or an update/change made to an existing predictive model, the predictive model may be available to the selected vehicles. For instance, once a predictive model is updated and stored in the predictive model knowledge base, the predictive model may be downloaded to one or more vehicles in the fleet. The available predictive model may be downloaded or updated in the one or more selected in a dynamic manner. FIG. 15 illustrates an example of dynamically updating predictive models in vehicles.

As described above, predictive models may include models that are used for the vehicle's autonomous mobility, for vehicle cabin(s) personalization and other functions performed inside the vehicle and/or vehicle cabin(s), for the safe and optimized operation of a fleet, and/or various other applications in addition to data management and data orchestration. A new model may be created in order to enable the vehicle to address a new situation. A model may be updated in order to improve an overall performance based on new data that has been collected and stored in the cloud data lake. In some cases, a list of the predictive models that are used by a particular vehicle in a fleet or a set of vehicles accessible by a system is maintained in a vehicles database.

In some cases, such update, change or creation of a new model may be detected automatically by a component of the predictive model management module. For example, with reference to FIG. 15, a predictive model update module 1501 may be notified by the predictive model knowledge base 1503 when a new model is created or an existing model has been updated. The predictive model update module 1501 may then select one or more vehicles to receive a copy of the updated model. The one or more vehicles may be selected or determined based on subscription, utilization of the model or other criteria. The predictive model update component may also determine when the model is updated in the selected vehicle. For instance, the predictive model update component may determine that the model needs to be updated immediately, when the vehicle is at rest (e.g., during maintenance, cleansing, repair, etc.), or on an as-needed basis. For example, in the case of a vehicle that is part of a ride-hailing fleet, a predictive model for making right hand turns at night when there is a gaming taking place in the San Francisco baseball part may be needed only if the vehicle is assigned to complete a ride that involves going through the impacted area (e.g., to pick up a passenger, to drop off a passenger, or passing through that area in the process of picking up or dropping off a passenger somewhere else). The predictive model update module 1501 may be part of the Cloud's Subscription Module as described above.

Referring back to FIG. 4, the cloud or data center 420 or the provided vehicle data management system may also comprise a data and metadata management module 425. The data and metadata management module 425 may perform various functions including data processing conducted by the data processing module 411, as well as metadata creation and management. The data and metadata management module may be configured to store and manage the data and associated metadata that is generated by the autonomous vehicle, and process queries and API calls issued against the data and the metadata. Details about the data and metadata management module are discussed in connection with FIG. 8 to FIG. 12, for example.

The cloud or data center 420 may further comprise cloud applications 423, and a user interface (UI) module 425 for viewing analytics, sensor data (e.g., video), and/or processed data. The UI may also include a management UI for developing and deploying analytics expressions, deploying data orchestration applications to the edge (e.g., autonomous vehicle operating system, edge gateway, edge infrastructure, data orchestrator), and configuring and monitoring the data orchestration.

Figure 8:
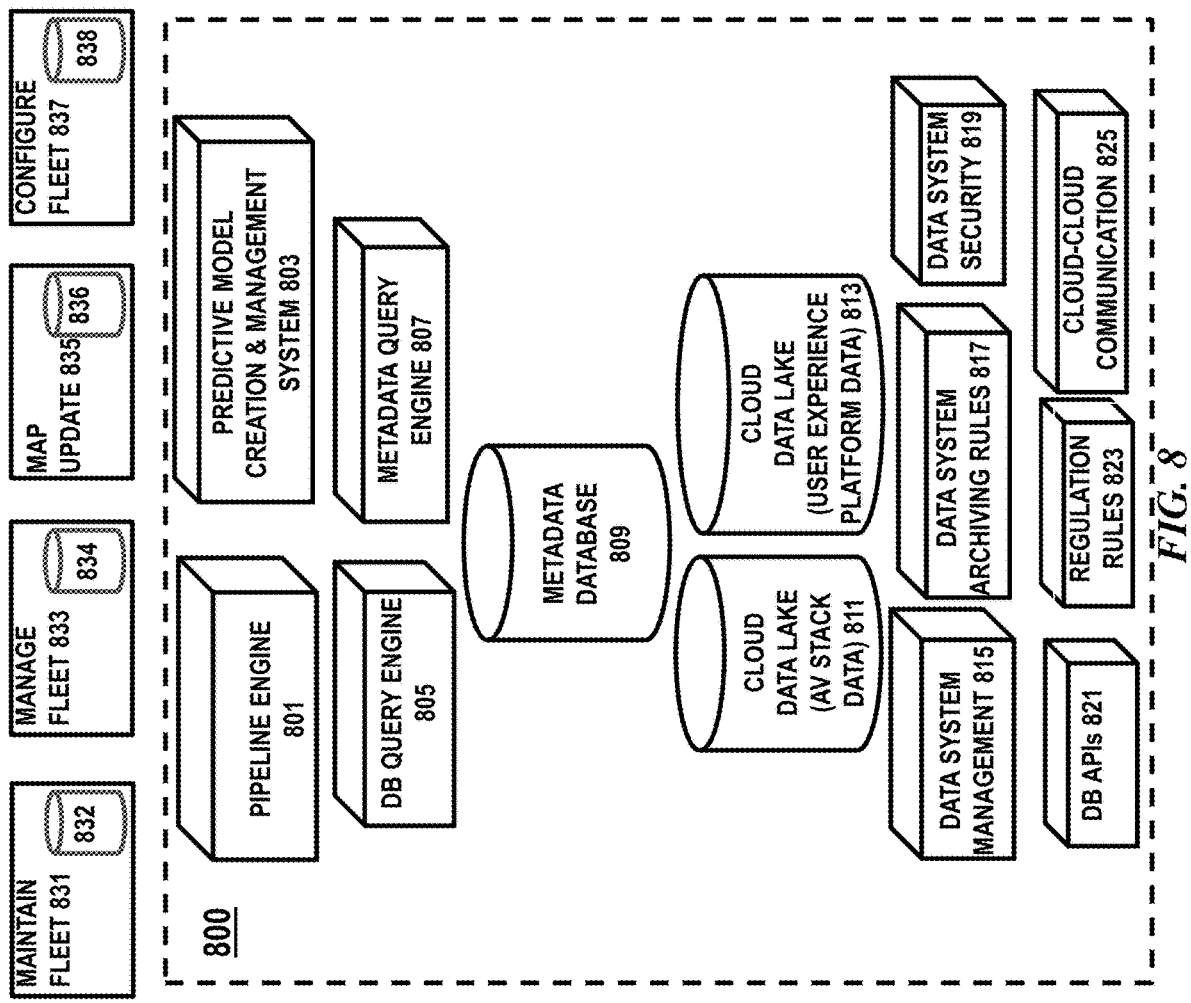
FIG. 8 shows example components of a data management system.

FIG. 8 shows example components of a vehicle data management system 800 and particularly the components of the vehicle data management system that reside on a remote entity (e.g., data center). In some embodiments, the vehicle data management system 800 may comprise a data and metadata management system and a predictive model creation and management system. The data and metadata management system can be the same as the data and metadata management module as described above. The data and metadata management system may be configured to store and manage the data and associated metadata that is generated by the autonomous vehicle, and process queries and API calls issued against the data and the metadata. In some embodiments, the vehicle data management system 800 may comprise a data and metadata management system including at least a pipeline engine 801 and a predictive model creation and management system 803. In some embodiments, the data and metadata management system may comprise other functional components such as a database query engine 805, metadata query engine 807, data system management 815, data system archiving rules 817, data system security 819, database APIs 821, regulation rules 823 and cloud-cloud communication 825. For example, the metadata database 809 can be accessed using a Metadata Query Language through the database query engine 805. In another example, data in the data lakes 811, 813 can be accessed as a result of metadata queries or be accessed directly using the database query engine 805. The cloud-cloud communication 825 may include various communication protocols such as VLAN, MPLS, TCP/IP, Tunneling, HTTP protocols, wireless application protocol (WAP), vendor-specific protocols, customized protocols, and others. The cloud-cloud communication may comprise an interface that may be used by systems (e.g., cloud-based systems) and/or devices and may utilize a variety of APIs (e.g., APIs using REST architecture, SOAP, Web Services, Enterprise Service Bus protocol or any data exchange protocol designed to provide approaches for system to system and/or process to process communication). In some embodiments, the vehicle data management system 800 may further comprise a metadata database 809, a cloud data lake for storing autonomous vehicle stack data 811 and a cloud data lake for storing user experience platform data 813.

In some embodiments, one or more of the components as described above may interact with one or more cloud applications or enterprise applications (e.g., maintain fleet 831, manage fleet 833, map update 835, configure fleet 837). The cloud applications may be hosted on the remote entity and may utilize vehicle data managed by the data management system. In some cases, the cloud application may have a database or knowledge base 832, 834, 836, 838 that is created by the predictive model creation and management system 803. In some cases, the cloud application may have permission to access and manipulate data stored in the cloud data lake for storing autonomous vehicle stack data 811, the cloud data lake for storing user experience platform data 813, or the metadata stored in the metadata database 809. In some cases, data may be dispatched to the cloud applications and, in order to dispatch data to the corresponding cloud applications (as identified in the metadata or Application Table), the predictive model creation and management system may have the addresses of all of the resources (i.e., applications) on the cloud listed locally in a table for quick lookup.

The pipeline engine 801 may be configured to preprocess continuous streams of raw data or batch data transmitted from a data orchestrator. For instance, data may be processed so it can be fed into machine learning analyses. Data processing may include, for example, data normalization, labeling data with metadata, tagging, data alignment, data segmentation, and various others. In some cases, the processing methodology is programmable through APIs by the developers constructing the machine learning analysis.

Figure 9:
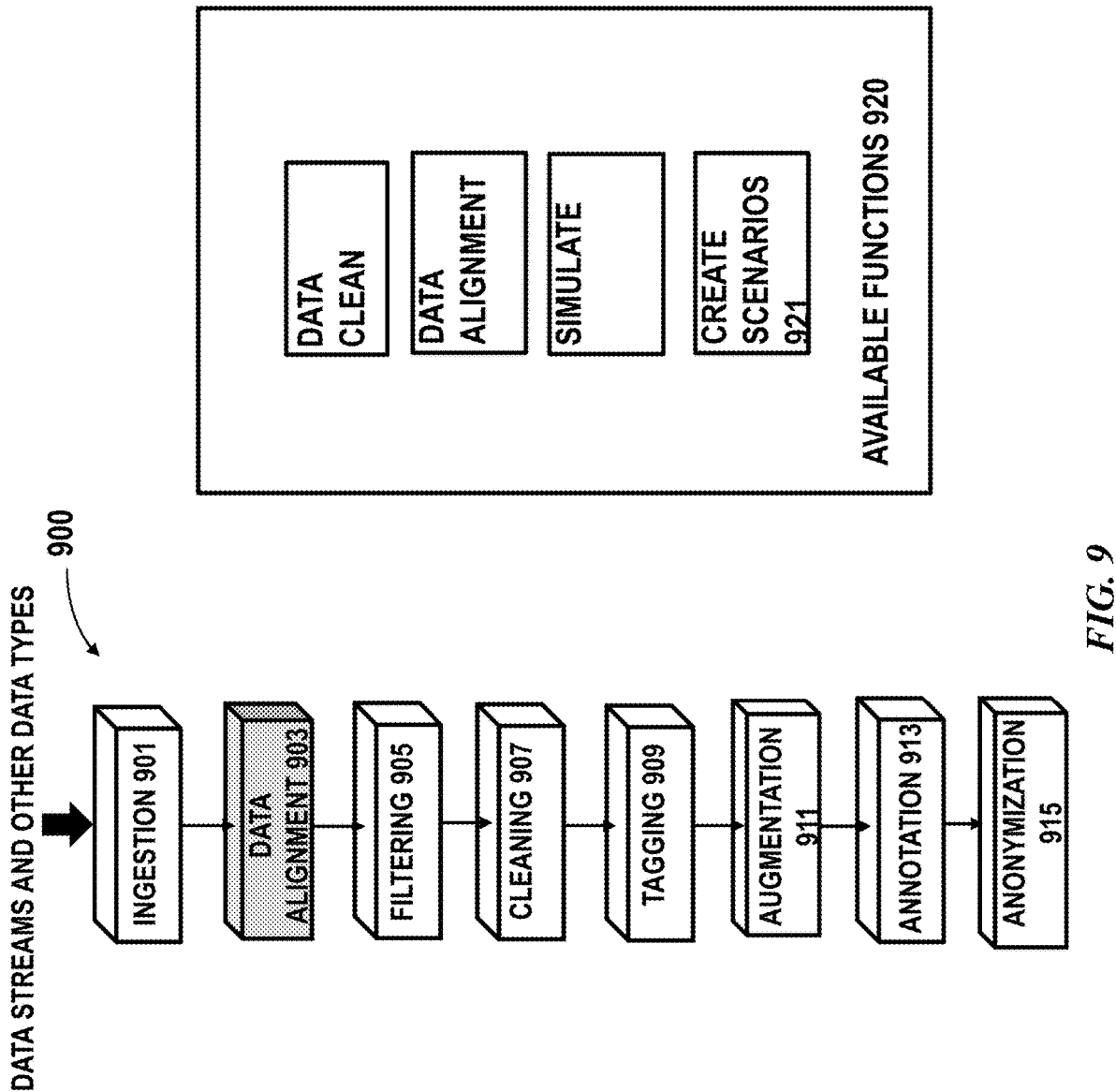
FIG. 9 shows an example of data ingestion pipeline and functions performed by a pipeline engine.

FIG. 9 shows an example of data ingestion pipeline 900 and functions performed by a pipeline engine. The pipeline 900 may include a plurality of functions for processing data that is being ingested in streams or in batch. The data may include, for example, simulation data, data from the vehicle such as fleet data, operating environment data, transportation data, vehicle telemetry, data generated by AV stack and user experience platform, third-party partner data (e.g., data from user mobile application), sensor data (e.g., GPS, IMU, camera, Lidar, infrared sensor, thermal sensor, ultrasonic sensor, etc), geolocation data, and various others as described elsewhere herein. The stream data may comprise a variety of types of data including, without limitation: time series data such as spatio-temporal point measurements of an environment, multi-dimensional data such as gridded measurements from Radar, Lidar, satellites, sonars, and/or an output of a simulation process formed in array-oriented data format or any other data format suitable for representing multi-dimensional data, visualization data such as map tiles, metadata, raw data such as raw input data from sensors, documents, digital services, source code of data collection, integration, processing analysis, and various others. The batches may be tenant specific, application specific, and grouped into context aware sub-groups for parallel processing. The batches may be generated and transmitted from the data orchestrator as described elsewhere herein.

The pipeline 900 may be customizable. For example, one or more functions of the pipeline 900 may be created by a user. Alternatively or in addition to, one or more functions may be created by the management system or imported from other systems or third-party sources. In some cases, a user may be permitted to select from a function set (e.g., available functions 920) and add the selected function to the pipeline. In some cases, creating or modifying a pipeline may be performed via a graphical user interface (GUI) provided by a user interface module (e.g., user interface module 425 in FIG. 4). For example, a set of available functions may be displayed within a GUI. A user may select, within the GUI, a graphical element representing the CREATE SCENARIOS function by clicking the function or add the function to the current pipeline by drag-and-drop.

In some cases, the graphical user interface (GUI) or user interface may be provided on a display. The display may or may not be a touchscreen. The display may be a light-emitting diode (LED) screen, organic light-emitting diode (OLED) screen, liquid crystal display (LCD) screen, plasma screen, or any other type of screen. The display may be configured to show a user interface (UI) or a graphical user interface (GUI) rendered through an application (e.g., via an application programming interface (API) executed on the user device, on the cloud or on the data orchestrator).

In some embodiments, the plurality of functions may comprise third-party functions such as ingestion 901, filtering 905, cleaning 907, tagging 909, augmentation 911, annotation 913, anonymization 915, and various others (e.g., simulate). For example, data cleaning 907 may include removing noise from data (e.g., noise reduction in image processing), correcting erroneous data (e.g., one camera is malfunctioning and shows no light but it's daytime), establishing common data formats (e.g., use metric system, all numbers to third decimal, etc.), or preparing data such that it can quickly and easily be accessed via APIs by intended data consumers or applications. In another example, data augmentation 911 may include combining synthetic with real data for more complete data sets to test autonomous vehicle models, enhancing captured data with data from partners to enable certain types of predictions, combining traffic congestion data with weather data to predict travel time, combining several data sets to create information-rich data, (e.g., combine vehicle operating data, with city transportation infrastructure data, and congestion data to predict vehicle arrival times during specific times of the day). In a further example, data tagging 909 or annotation 913 may include annotation of multimedia data (e.g., image, Lidar, audio) that happens at every level and creation of metadata. Metadata may be created during the movement of data in the data management environment. For instance, an image may need to be retrieved annotated (most likely with some manual intervention) and then re-indexed. The created metadata may be incorporated into the metadata catalog. Other metadata such as manually or automatically generated metadata of various types may also be inserted in the metadata catalog. The plurality of functions may also comprise proprietary functions such as data alignment 903 and create scenarios 921.

Figure 10:
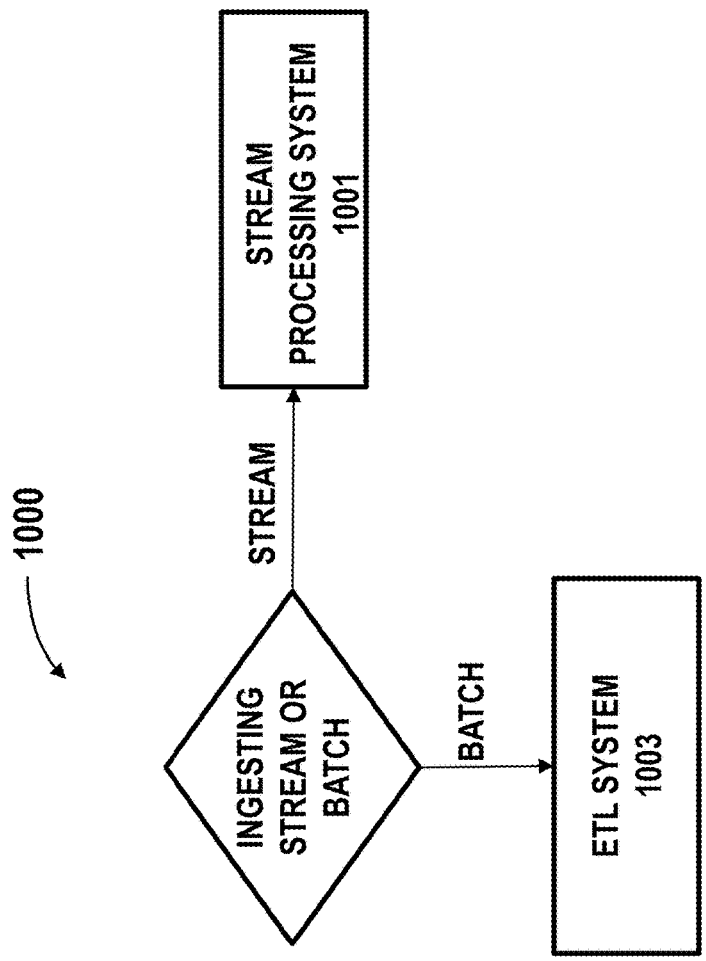
FIG. 10 shows an example data ingestion process.

FIG. 10 shows an example data ingestion process 1000. In some cases, stream data and/or batch data may be ingested in the pipeline engine. In some cases, the ingested stream data may be delivered to a stream processing system 1001 and the ingested batch data may be delivered to an extract-transform-load (ETL) system 1003. The ETL system 1003 may perform traditional ETL functionalities or customized functionalities. For instance, the ETL system may transform the ingested batch data to a format more useful to a user. For example, the data transformation may include selecting only certain columns to load into a format, translating coded values, deriving new calculated values, sorting data, aggregating data, transposing or pivoting data, splitting a column into multiple columns, and other processing.

Though stream processing system 1001 and ETL system 1003 are discussed herein, additional modules or alternative modules may be used to implement the functionality described herein. Stream processing system and ETL system are intended to be merely exemplary of the many executable modules which may be implemented.

In some cases, data alignment may be performed by the ETL system or the stream processing system. In some cases, data captured by different sensors (e.g., sensors may capture data at different frequency) or from different sources (e.g., third-party application data) may be aligned. For example, data captured by camera, Lidar, and telemetry data (e.g., temperature, vehicle state, battery charge, etc.) may be aligned with respect to time. In some cases, data alignment may be performed automatically. Alternatively or in addition to, a user may specify the data collected from which sensors or sources are to be aligned and/or the time window during which data is to be aligned. In an example, the result data may be time-series data aligned with respect to time. It should be noted that data can be aligned along other dimensions such as application, data structure, and the like.

Metadata

The vehicle data management system may provide metadata management. In some cases, metadata creation and management may be provided by the data and metadata managements system as described above. In some cases, metadata may allow for selection of a subset of data or a portion of the autonomous vehicle data based on the metadata. In some embodiments, metadata may provide information about sensors that capture sensory data (e.g., GPS, Lidar, camera, etc.), pre-processing on data (e.g., aligning and creating time series), and various applications and/or predictive models that operate on the data for a specific use case or application (e.g., avoiding pedestrians, pattern recognition, obstacle avoidance, etc). Metadata may be created onboard the vehicle. For example, metadata may be generated by the sensors or applications running on the vehicle. In another example, metadata may be generated by the data orchestrator onboard the vehicle. Metadata may be generated remote from the vehicle or by a remote entity. For example, metadata about data processing (e.g., alignment) may be generated in the data center or by a cloud application. In some cases, at least a portion of the metadata is generated onboard the vehicle and transmitted to a remote entity. In some cases, at least a portion of the metadata is generated by a component (e.g., cloud application or pipeline engine) provided on a remote entity. The created metadata may be stored in a metadata database managed by the data management system. As an alternative or in addition to, the metadata may be stored in a database having at least some or all of the data used to generate the metadata.

Figure 11:
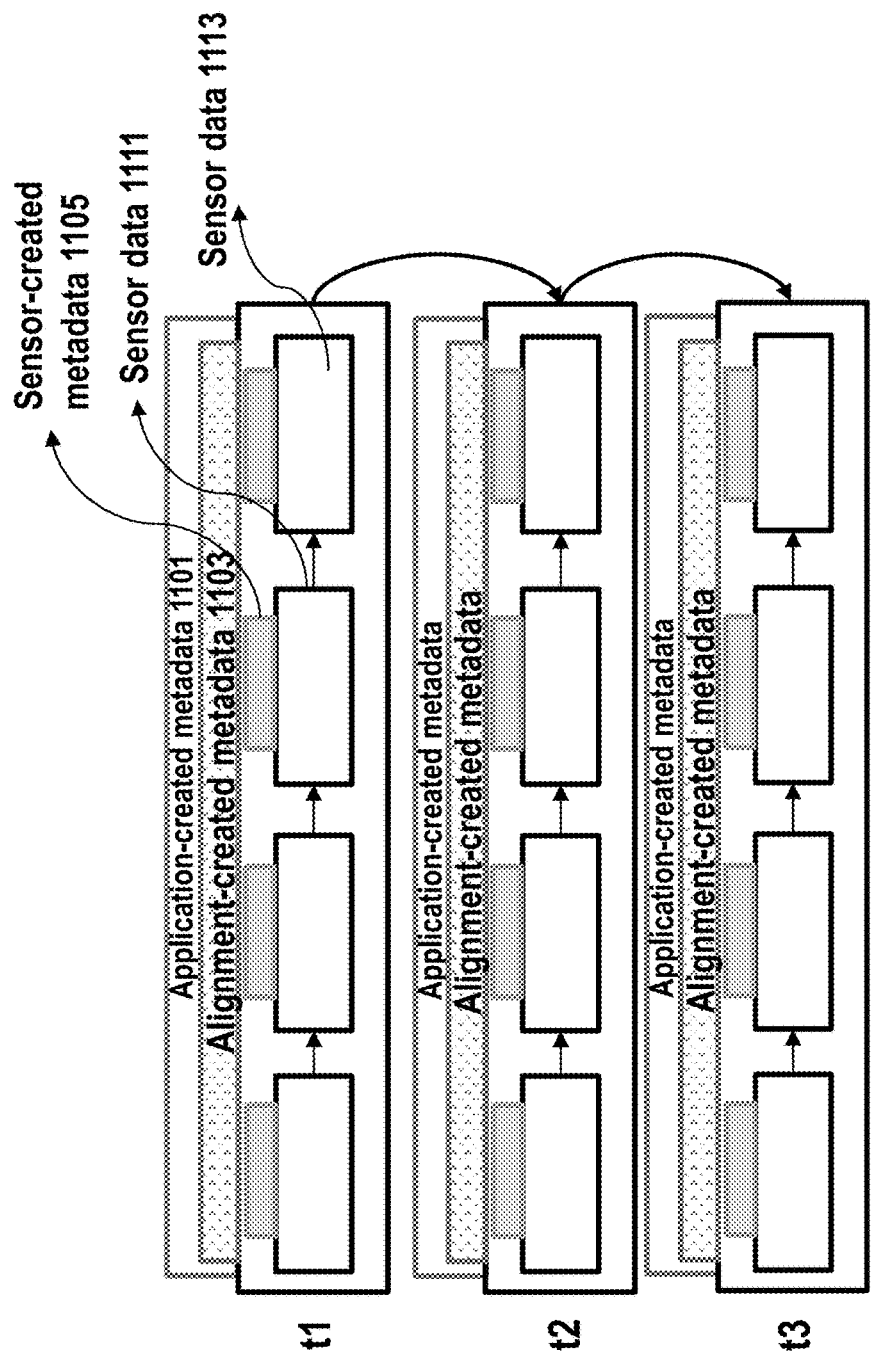
FIG. 11 illustrates an example of metadata generated by data processing such as alignment, metadata generated by an application and/or a sensor.

FIG. 11 illustrates an example of metadata generated by alignment, application and sensor. For example, when different sensor data 1111, 1113 are aligned, metadata (e.g., alignment-created metadata 1103) may be created to provide alignment information (e.g., structure padding, frequency, time window, etc). In some cases, metadata about the sensor or sources producing the data (e.g., sensor-created metadata 1105) may be created. For example, the sensor-created metadata may include information about the sensor, identifier of the sensor, data type, and others. In some cases, metadata about the application (e.g., application-created metadata 1101) may be created by the application that process and/or generate the data. For example, the application-created metadata 1101 may provide information about the name of the application, developer of the application, application version and various others.

Figure 12:
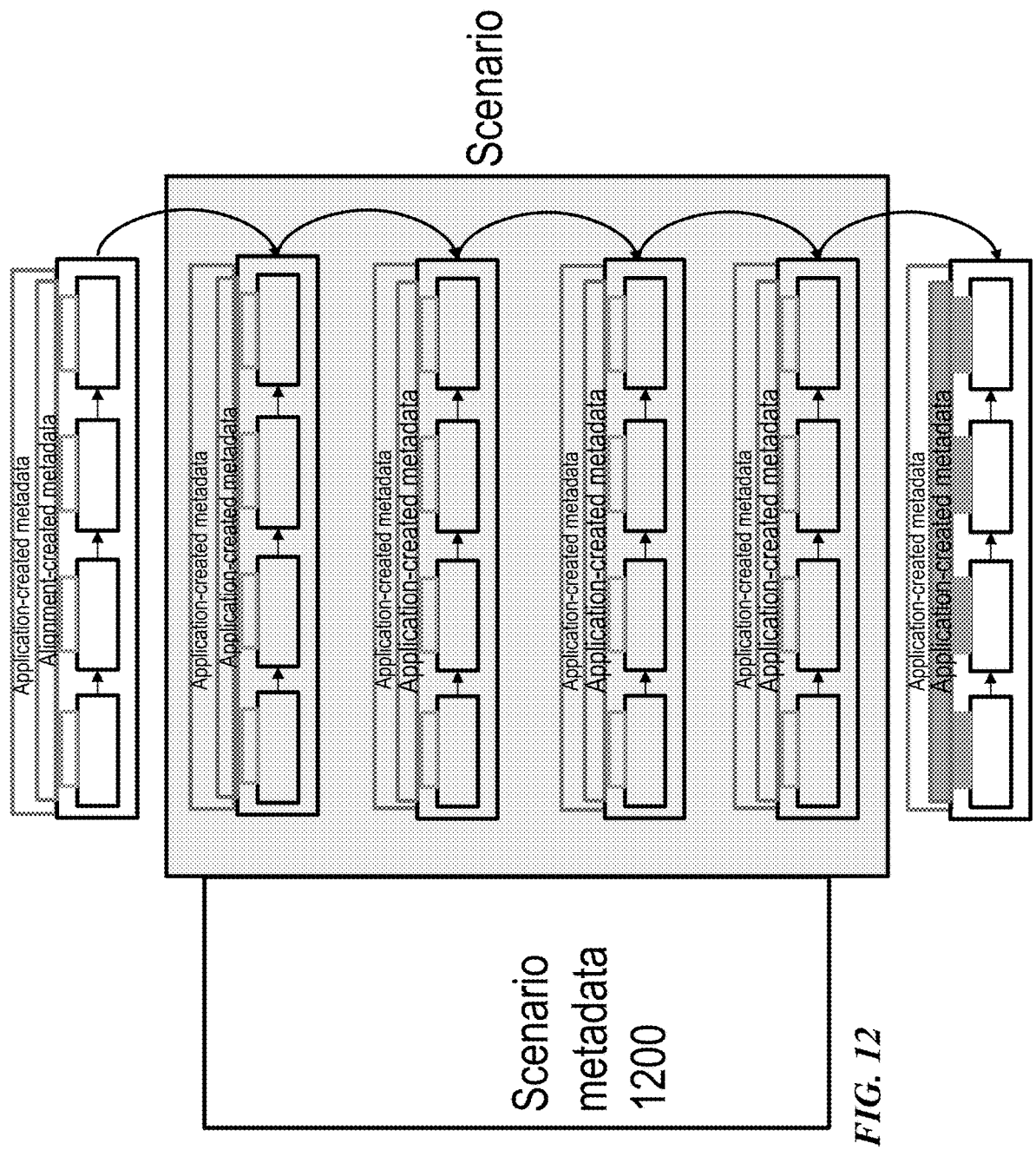
FIG. 12 shows an example of scenario metadata.

In some embodiments, the data management system may generate metadata of metadata for fast retrieving or querying data from the database. For example, scenario metadata may be created to specify the characteristics of the scenario using a specific metadata which is then used to retrieve the appropriate vehicle data from the database. FIG. 12 shows an example of scenario metadata 1200. In the following example, a scenario data object describing a scenario where a vehicle is making a right-hand turn to merge from a city street onto a freeway during a cloudy morning may be defined as:

```
Scenario_Name: e.g., right-hand merge
Scenario_Type: e.g., right-hand merging into freeway
Static_Objects: e.g., tree
Dynamic_Objects: e.g., moving_vehicle
Environment: e.g., cloudy_morning
Scene_Description: e.g., vehicles entering freeway from urban surface street
Trigger_Rules: e.g., start selections 10 seconds before the vehicle approaches the intersection and
stop 20 seconds after the merge completes
Data: e.g., time-series-segment1
```

Below is an example process of creating a new scenario object:

```
Step 1 Specify the Scenario_Type
Step 2 Specify each Static_Object, each Dynamic_Object, and the Scene_Description using the
metadata in the MetadataCatalog
Step 3 Issue a query using the Metadata Query Language using the selected metadata to create the
ResultSet
Step 4 If the ResultSet is empty Then determine if NewTimeSeriesData can be physically collected
or simulated, Else go to Step 7.
Step 5 If NewTimeSeriesData needs to be simulated Then determine if the entire data set needs to
be simulated Or whether only part of the data set needs to be simulated and then merged with
physically collected data. Go to Step 6.
Step 6 Process the NewTimeSeriesData (collected, simulated, or combination thereof) using the
Data_Ingestion_Pipeline
Step 7 For each TimeSeries in the NewTimeSeriesDataSet
    a. Select the TimeSeries segment that satisfies the specified metadata in Step 2 using the
Triger_Rules to create the TimeSeriesSegment.
    b. Create a new ScenarioObject
    c. Associate a name with the selected segment
    d. Fill in the metadata from Step 2
    ed. Insert the TimeSeriesSegment in the ScenarioObject
```

Computer Systems

Figure 13:
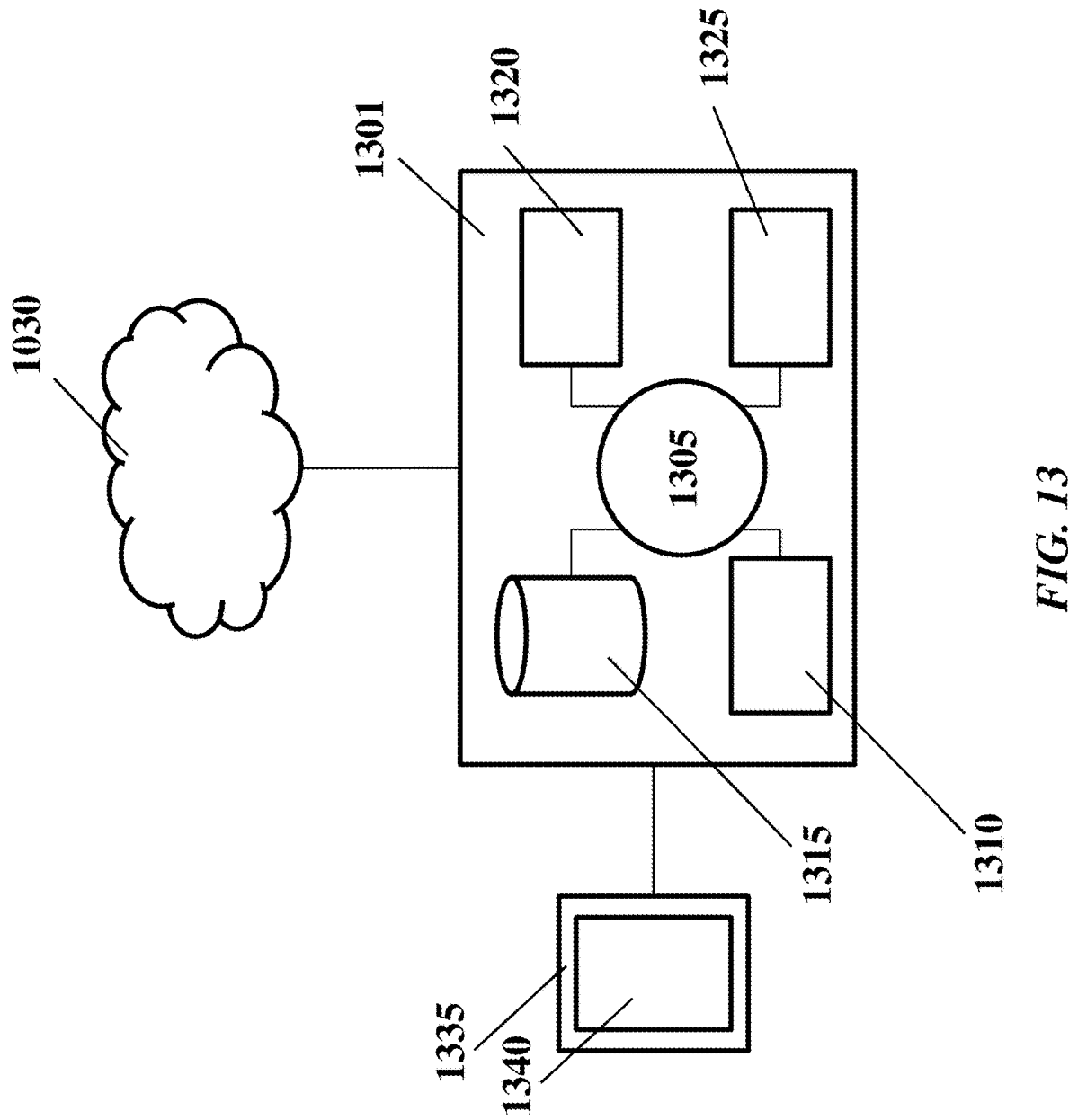
FIG. 13 shows a computer system that is programmed or otherwise configured to implement the data management system.

The vehicle data management system, data orchestrator, or processes described herein can be implemented by one or more processors. In some embodiments, the one or more processors may be a programmable processor (e.g., a central processing unit (CPU), a graphic processing unit (GPU), a general-purpose processing unit or a microcontroller), in the form of fine-grained spatial architectures such as a field programmable gate array (FPGA), an application-specific integrated circuit (ASIC), and/or one or more Advanced RISC Machine (ARM) processors. In some embodiments, the processor may be a processing unit of a computer system. FIG. 13 shows a computer system 1301 that is programmed or otherwise configured to implement the data management system. The computer system 1301 can regulate various aspects of the present disclosure.

The computer system 1301 includes a central processing unit (CPU, also "processor" and "computer processor" herein) 1305, which can be a single core or multi core processor, or a plurality of processors for parallel processing. The computer system 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1125 are in communication with the CPU 1305 through a communication bus (solid lines), such as a motherboard. The storage unit 1315 can be a data storage unit (or data repository) for storing data. The computer system 1301 can be operatively coupled to a computer network ("network") 1030 with the aid of the communication interface 1320. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1301, can implement a peer-to-peer network, which may enable devices coupled to the computer system 1301 to behave as a client or a server.

The CPU 1305 can execute a sequence of machine-readable instructions, which can be embodied in a program or software. The instructions may be stored in a memory location, such as the memory 1310. The instructions can be directed to the CPU 1305, which can subsequently program or otherwise configure the CPU 1305 to implement methods of the present disclosure. Examples of operations performed by the CPU 1305 can include fetch, decode, execute, and writeback.

The CPU 1305 can be part of a circuit, such as an integrated circuit. One or more other components of the system 1301 can be included in the circuit. In some cases, the circuit is an application specific integrated circuit (ASIC).

The storage unit 1315 can store files, such as drivers, libraries and saved programs. The storage unit 1315 can store user data, e.g., user preferences and user programs. The computer system 1301 in some cases can include one or more additional data storage units that are external to the computer system 1301, such as located on a remote server that is in communication with the computer system 1301 through an intranet or the Internet.

The computer system 1301 can communicate with one or more remote computer systems through the network 1030. For instance, the computer system 1301 can communicate with a remote computer system of a user (e.g., a user device). Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 1301 via the network 1030.

Methods as described herein can be implemented by way of machine (e.g., computer processor) executable code stored on an electronic storage location of the computer system 1301, such as, for example, on the memory 1310 or electronic storage unit 1315. The machine executable or machine readable code can be provided in the form of software. During use, the code can be executed by the processor 1305. In some cases, the code can be retrieved from the storage unit 1315 and stored on the memory 1310 for ready access by the processor 1305. In some situations, the electronic storage unit 1315 can be precluded, and machine-executable instructions are stored on memory 1310.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1301 can include or be in communication with an electronic display 1335 that comprises a user interface (UI) 1340 for providing, for example, a graphical user interface as described elsewhere herein. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1305. The algorithm can, for example, trained models such as predictive model.

Figure 16:
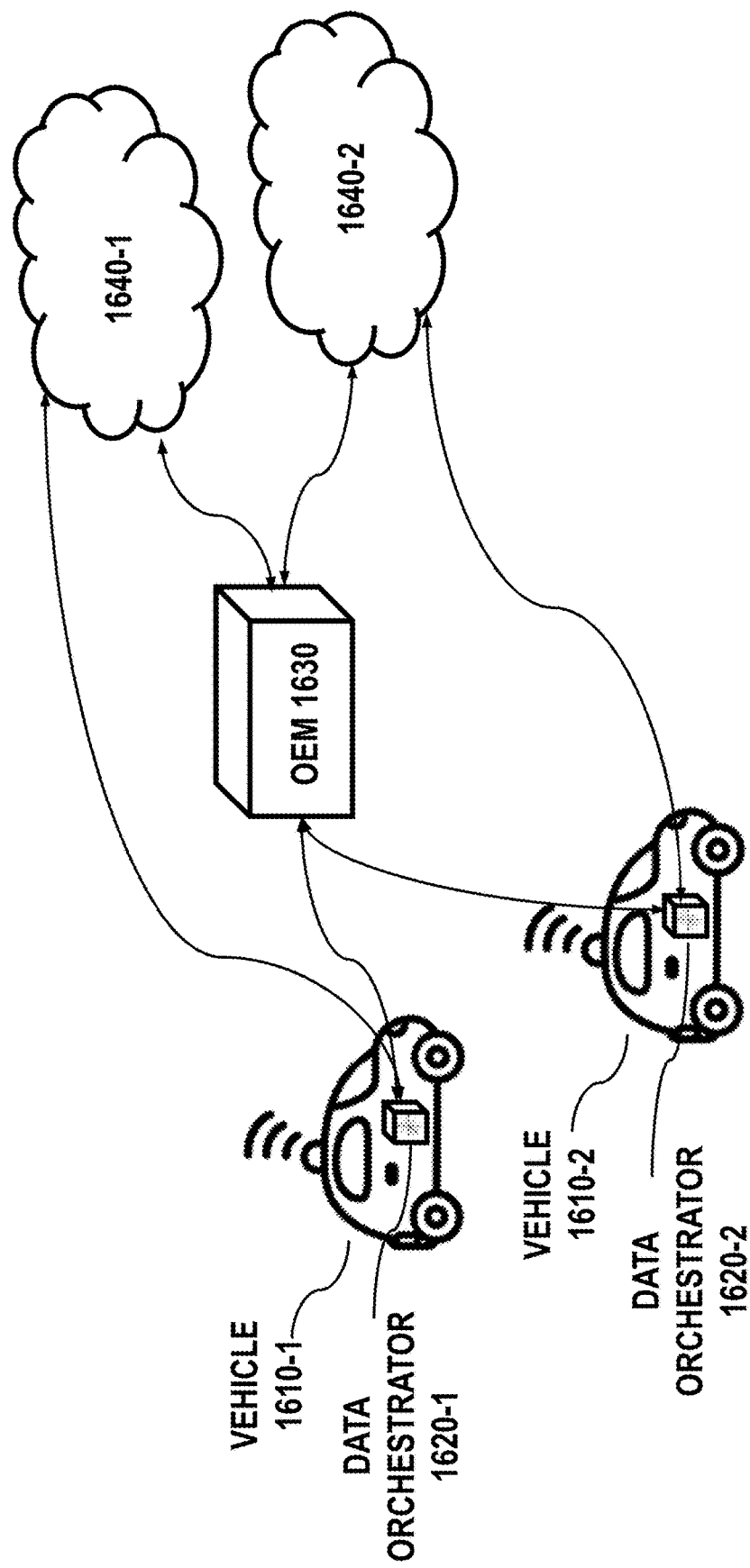
FIG. 16 schematically shows data transmission managed with aid of an OEM, in accordance with some embodiments of the invention.

In some embodiments, at least a portion of the vehicle data may be transmitted to a remote entity (e.g., cloud applications) according to a pre-determined data transmission scheme that is not generated using AI algorithms. For instance, in some situations, when the data transmission is infrequent or the amount of data to be transmitted is relatively small, a data transmission scheme may be generated based on a request from a cloud application without using the machine learning models. In such situations, the data transmission may be managed by an intermediary entity (e.g., original equipment manufacturer (OEM)) that processes/passes requests and responses between the remote entity and the data orchestrator residing on the target vehicle. The intermediary entity may act as a proxy to pass the unmodified or processed data transmission requests/responses between the remote entity and the data orchestrator. In some cases, the intermediary entity may determine one or more target vehicles to transmit vehicle data based on the request. In some cases, the intermediary entity may further aggregate or assemble at least a portion of the vehicle data and send it to the requesting application. In some cases, the intermediary entity may generate metadata describing the vehicle data and/or information about the transmission (e.g., data source, data processing method, etc) and transmit the metadata to the requesting application. FIG. 16 schematically shows data transmission managed with aid of an OEM 1630, in accordance with some embodiments of the invention.

An OEM 1630 may manage basic vehicle data and functionalities. The OEM 1630 may communicate directly with a remote entity such as one or more cloud applications, enterprise cloud or other third party entities 1640-1, 1640-2 as described elsewhere herein. The OEM may provide runtime software components or basic software services such as perception (e.g., ASIC, FPGA, GPU accelerators, SIMD memory, sensors/detectors, such as cameras, Lidar, radar, GPS, etc.), localization and planning (e.g., data path processing, DDR memory, localization datasets, inertia measurement, GNSS), decision or behavior (e.g., motion engine, ECC memory, behavior modules, arbitration, predictors), control (e.g., lockstep processor, DDR memory, safety monitors, fail safe fallback, by-wire controllers), connectivity, and I/O (e.g., RF processors, network switches, deterministic bus, data recording). The OEM may collect or manage telematics data generated by the aforementioned software services or sensors. The telematics data may include, for example, speed related data (e.g., harsh acceleration, speeding, frequent acceleration), stop related data (e.g., harsh braking, frequent stopping, frequent braking), turn related data (e.g. harsh turning, acceleration before turn, overbraking before exit, swerving), data related to routes normally driven (e.g., highways versus local roads, areas with known traffic congestion, areas with high/low accident rates) or others (e.g., fatigued turning, usually driving on the fast lane, usage of turn indicators). An OEM 1630 may be in communication with one or more vehicles 1610-1, 1610-2 and/or one or more data orchestrators 1620-1, 1620-2.

In some embodiments, an intermediary entity such as the OEM may manage a data and knowledge management system which is configured to determine which predictive model(s) from the predictive model management module to send to a selected vehicle, or fleet of vehicles, and which component(s) may receive these models. In some cases, the model(s) may be transmitted OTA to the related vehicle(s) through the Cloud Subscription Module. In some cases, a remote application may request data from one or more vehicles by sending a request to the OEM. For instance, an insurance application may request certain type of data from an OEM system associated with a target vehicle (e.g., data collected by OEM-embedded devices) at a pre-determined frequency (e.g., a week, two weeks, a month, two months, etc) for purpose of detecting fraud, creating new insurance products, providing discounts to drivers for safety features, assessing risk, accident scene management, first notice of loss, enhancing claims process and the like. The OEM may then pass the request to the data orchestrator associated with the target vehicle to coordinate a data transmission. The requested type of data may be transmitted from the data orchestrator to the requesting application 1640-1, 1640-2 directly.

Figure 17:
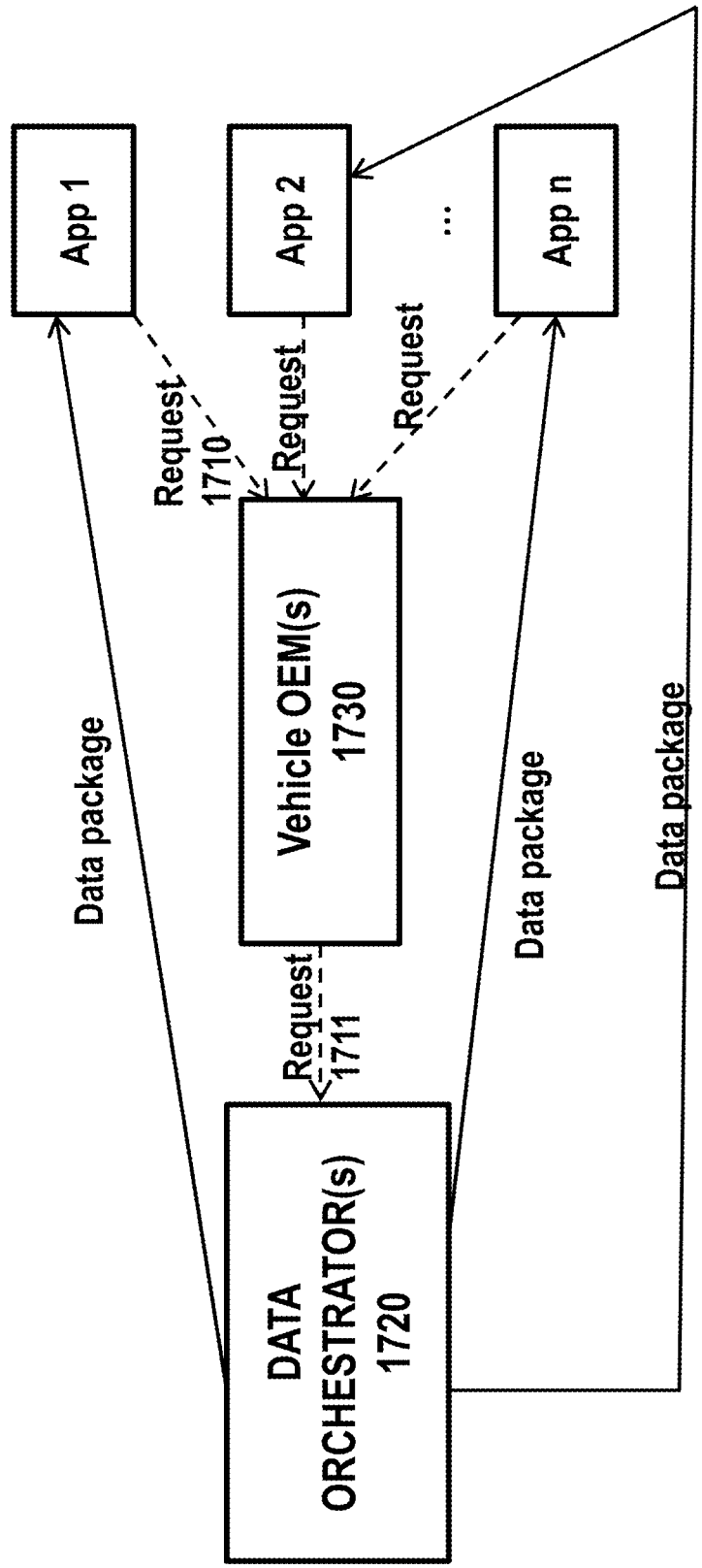
FIG. 17 shows a data transmission process between a data orchestrator and one or more cloud applications.

FIG. 17 shows a data transmission process between a data orchestrator 1720 and one or more cloud applications. In some cases, a data transmission between one or more data orchestrators and one or more cloud applications may be coordinated and managed with aid of an intermediary entity such as vehicle OEM 1730. The data orchestrator may reside locally with a vehicle as described elsewhere herein.

In some embodiments, the one or more cloud applications may send request 1710 to the vehicle OEM 1730 requesting certain type of vehicle data. For example, the request 1710 may contain information about the type of data needed by the application (e.g., App 1), the frequency with which the data are needed, a period of time for such type of data to be transmitted, or other information such as the target vehicle identification number. For instance, a requesting application App 1 (e.g., insurance application) may send to the vehicle OEM 1730 associated with a target vehicle a request indicating the type of data and the frequency of such data are needed from the target vehicle.

The vehicle OEM 1730 may pass the request 1711 (e.g., send a request message to relay the request) to the data orchestrator of the target vehicle. The request 1711 passed to the data orchestrator may be unmodified request that is the same as the original request 1710. Alternatively or in addition to, the vehicle OEM 1730 may process the request 1710 received from the cloud application App 1 and determine which vehicles/data orchestrators are the target vehicles/data orchestrators to receive the request 1711. For example, the original request 1710 may request telematics data from a type of vehicles for enhancing claims process without specifying a target vehicle (e.g., not knowing the vehicle ID), then the vehicle OEM 1730 may identify the target vehicles meeting the requirement of the vehicle type and send the requests 1711 to the identified target vehicles/data orchestrators. In some cases, the request may specify a group of vehicles. For instance, the request may specify a particular model (e.g., Audi A8), a model year (e.g., 2017), a model with specific driving automation features (e.g., A8 with lane change monitor), and the like. The OEM system may pass the request (e.g., send a request message to relay the request) to the data orchestrator of the respective target vehicle. As mentioned above, the vehicle OEM may act as a proxy to pass the requests and responses between the data orchestrator and the requesting application. This may advantageously add a layer of security since the vehicle ID or other vehicle information may not be exposed to the third party (e.g., cloud applications).

Upon receiving the request 1711, the data orchestrator may push the request to a queue and send back a message to the vehicle OEM 1730 to acknowledge receipt of the request. The vehicle OEM 1730 may then send a message (i.e., response) to the requesting application indicating the request has been logged.

The one or more data orchestrators associated with the target vehicles may transmit the requested vehicle data to the requesting application based on the information contained in the request 1711. For example, the one or more data orchestrators may send the requested data (e.g., data packets) directly to the requesting application.

In some cases, in addition to passing and relaying the request/response messages, the vehicle OEM may send instructions to coordinate data transmission. For example, the vehicle OEM may send a message to the data orchestrator instructing the data orchestrator to delete the transmission request from the queue when a transmission period is completed (e.g., upon receiving a completion message from the data orchestrator). The data orchestrator may then delete the entry from the queue and send a message to the vehicle OEM indicating the entry is deleted. The OEM system may send a message to the requesting application indicating the request is completed.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A data orchestrator for managing vehicle data for a vehicle, comprising:
   a data storage unit storing (i) application data related to one or more applications that generate one or more subsets of said vehicle data, and (ii) entity data related to one or more remote entities that request said one or more subsets of said vehicle data, wherein said data storage unit is local to said vehicle where said vehicle data is collected or generated;
   a database, local to said vehicle and accessible to the data orchestrator, and configured as a knowledge base storing a machine learning-based predictive model, trained and tested using metadata and said vehicle data, and user-defined rules for determining a data transmission rule comprising at least one of: (i) a selected portion of said vehicle data to be transmitted; (ii) a timing for transmitting said selected portion of said vehicle data; and (iii) a remote entity of said one or more remote entities that is designated to receive said selected portion of said vehicle data, wherein (a) said vehicle data comprises sensor data processed by a pipeline engine, (b) said metadata is generated from said sensor data, and (c) wherein additional metadata is generated when said vehicle data is processed by said pipeline engine; and
   a transmission module configured to transmit said selected portion of said vehicle data based at least in part on said application data, said entity data, and said data transmission rule.

2. The data orchestrator of claim 1, wherein said transmission module is provided onboard said vehicle.

3. The data orchestrator of claim 1, wherein said one or more remote entities comprise a cloud application, a data center, a third-party server, or another different vehicle.

4. The data orchestrator of claim 1, wherein said data storage unit is further configured to store supplemental data indicative of an availability of said one or more subsets of said vehicle data, a transmission timing delay, a data type of said one or more subsets of data, or a transmission protocol.

5. The data orchestrator of claim 1, wherein said machine learning-based predictive model is based at least in part on a model tree structure.

6. The data orchestrator of claim 5, wherein said model tree structure is used to represent one or more relationships between one or more models comprising said machine learning-based predictive model.

7. The data orchestrator of claim 5, wherein at least one node of said model tree structure is used to represent said machine learning-based predictive model, and wherein said node includes at least one of a model architecture, a set of model parameters, a training dataset, or a test dataset.

8. The data orchestrator of claim 1, wherein said machine learning-based predictive model is configured to be generated by a model creator located in a data center remote to said vehicle.

9. The data orchestrator of claim 8, wherein said model creator is configured to generate one or more machine learning-based predictive models that are usable by or customized for said vehicle.

10. The data orchestrator of claim 1, wherein said metadata is associated with a sensor that captures said sensor data.

11. The data orchestrator of claim 1, wherein the pipeline engine comprises one or more functional components.

12. The data orchestrator of claim 11, wherein at least one of said one or more functional components is selected from a set of functions via a user interface.

13. The data orchestrator of claim 11, wherein at least one of said one or more functional components is configured to create a scenario data object, wherein said scenario data object is usable for specifying a use scenario for said metadata.

14. The data orchestrator of claim 1, wherein said metadata is usable to retrieve a subset of said vehicle data from said remote entity for training said machine learning-based predictive model.

15. The data orchestrator of claim 1, where said knowledge base is configured to store one or more machine learning-based predictive models that are usable by or customized for said vehicle.

16. The data orchestrator of claim 1, wherein said selected portion of said vehicle data comprises an aggregation of two or more of said subsets of said vehicle data.

17. The data orchestrator of claim 1, wherein said vehicle is (i) a connected vehicle, (ii) a connected and automated vehicle, or (iii) a connected and autonomous vehicle.

* * * * *